United States Patent
Koyama

(10) Patent No.: US 8,073,039 B2
(45) Date of Patent: Dec. 6, 2011

(54) RECEPTION APPARATUS USING SPREAD SPECTRUM COMMUNICATION SCHEME

(75) Inventor: Masayuki Koyama, Hyogo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 12/968,016

(22) Filed: Dec. 14, 2010

(65) Prior Publication Data

US 2011/0085583 A1 Apr. 14, 2011

Related U.S. Application Data

(63) Continuation of application No. 11/010,301, filed on Dec. 14, 2004, now Pat. No. 7,873,100.

(30) Foreign Application Priority Data

Dec. 22, 2003 (JP) .................................. 2003-424892

(51) Int. Cl.
*H04B 1/00* (2006.01)
(52) U.S. Cl. .......................... 375/147; 375/148; 375/130
(58) Field of Classification Search .................. 375/148, 375/147, 130
See application file for complete search history.

(56) References Cited

U.S. PATENT DOCUMENTS

| | | | |
|---|---|---|---|
| 5,995,533 A | 11/1999 | Hassan et al. | |
| 6,122,311 A | 9/2000 | Watanabe et al. | |
| 6,137,788 A | 10/2000 | Sawahashi et al. | |
| 6,516,020 B1 | 2/2003 | Kurihara | |
| 2001/0038664 A1 | 11/2001 | Saito et al. | |
| 2002/0037030 A1 | 3/2002 | Goto | |
| 2002/0069379 A1 | 6/2002 | Reed et al. | |
| 2003/0123408 A1 | 7/2003 | Saitou | |

FOREIGN PATENT DOCUMENTS

| | | |
|---|---|---|
| JP | 9-506234 | 6/1997 |
| JP | 10-209919 | 8/1998 |
| JP | 10-271549 | 10/1998 |
| JP | 2000-138651 | 5/2000 |
| JP | 2000-307471 | 11/2000 |
| JP | 2000-308120 | 11/2000 |
| JP | 2001-510298 | 7/2001 |
| JP | 2001-526489 | 12/2001 |
| WO | WO 99/30433 | 6/1999 |

*Primary Examiner* — Shuwang Liu
*Assistant Examiner* — Michael Neff
(74) *Attorney, Agent, or Firm* — Oblon, Spivak, McClelland, Maier & Neustadt, L.L.P.

(57) ABSTRACT

In a reception apparatus, a matched filter that has conventionally been arranged in a searcher unit is mounted on an acquisition unit together with a large scale memory. The large scale memory once stores reception chip signals, and thereafter outputs them to the matched filter and to the delay profile calculation unit. A setting register receives an acquisition signal and outputs it to the matched filter. The matched filter performs acquisition of the reception chip signals outputted from the large scale memory, and outputs a despread timing signal to a despread circuit, a code generation circuit and the delay profile calculation unit.

2 Claims, 19 Drawing Sheets

RECEPTION APPARATUS USING SPREAD SPECTRUM COMMUNICATION SCHEME

CROSS-REFERENCE TO RELATED APPLICATIONS

This application is a continuation of and claims the benefit of priority from U.S. Ser. No. 11/010,301, filed Dec. 14, 2004, the entire contents of which are incorporated herein by reference, and claims the benefit of priority from Japanese Application No. 2003-424892, filed Dec. 22, 2003.

BACKGROUND OF THE INVENTION

1. Field of the Invention

The present invention relates to a reception apparatus, and more particularly, to a reception apparatus using a spread spectrum communication scheme.

2. Description of the Background Art

Recently, in the field of mobile communication and the like, a spread spectrum communication scheme is receiving attention. Generally, a demodulation unit of a conventional reception apparatus using the spread spectrum communication scheme is roughly divided into three blocks of a searcher unit, a spread spectrum demodulation unit, and a decode unit. The searcher unit searches the channel and the path of a reception signal. The spread spectrum demodulation unit despreads the spectrum of the reception signal and performs phase correction and rake combination of the reception signal. The decode unit performs viterbi error correction and the like of the reception signal subjected to the rake combination.

The conventional spread spectrum demodulation unit receives a despread timing signal from the searcher unit, and demodulates the reception signal according to this despread timing signal. The conventional searcher unit generally uses, as acquisition means, a matched filter. Since the conventional matched filter receives data being passed as it is, it is capable of performing an acquisition at that time point, but not capable of detecting an acquisition point before and after that time point. Additionally, the conventional spread spectrum demodulation unit has many operation demodulation units that correspond to respective paths and that is referred to as fingers so as to improve accuracy of rake combination.

A conventional reception apparatus disclosed in Japanese Patent Laying-Open No. 10-209919, when combining a demodulation output of each path by a data combiner, stores the demodulation output of each finger in a memory with a value of PN (Pseudorandom Noise) phase counter indicative of the phase of PN code of each finger set as a write address, and reads data of each memory with a common read address.

A conventional matched filter and CDMA (Code Division Multiple Access) reception apparatus disclosed in Japanese Patent Laying-Open No. 2000-307471 obtains correlation values generated among a plurality of signals arrived through multipath and chip delay information of the plurality of signals behind a reference reception timing signal surely and easily without increasing the circuit scale, and performs a rake combination process, monitoring of a delay profile and other operations.

The conventional reception apparatuses each demodulate a reception signal according to a despread timing signal from the searcher unit. Accordingly, there has been a problem that the searcher unit that occupies a circuit area is essential. Further, the matched filter used in the conventional searcher unit is not capable of detecting an acquisition point before and after the time point at which data is passed. Therefore, acquisition has been required to be repeated every time an instantaneous interrupt of synchronization occurs, and therefore time has been required. Still further, as the conventional reception apparatuses each require many finger operation units, there has been a problem that the circuit scale is increased.

Though the conventional reception apparatuses disclosed in the aforementioned patent documents may be certain means for solving part of the aforementioned problems, means for solving such problems are not limited to the means disclosed in the patent documents.

SUMMARY OF THE INVENTION

An object of the present invention is to provide a reception apparatus that is capable of reducing the circuit scale and the time required for acquisition.

The present invention is directed to a reception apparatus using a spread spectrum communication scheme, including: an input process unit wirelessly processing a reception signal and outputting a reception chip signal for each spread code; an acquisition unit performing an acquisition of the reception chip signal and outputting a timing signal together with the reception chip signal; a spread spectrum demodulation unit receiving the timing signal, performing a demodulation process of the reception chip signal outputted from the acquisition unit, and outputting a combination symbol signal; and an output process unit performing a decode process of the combination symbol signal and outputting audio data. The acquisition unit includes a memory temporarily holding the reception chip signal, and a matched filter detecting in advance a plurality of acquisition points when despreading in the spread spectrum demodulation unit based on an acquisition signal and the reception chip signal temporarily held in the memory.

According to the present invention, the circuit scale and the time required for acquisition can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
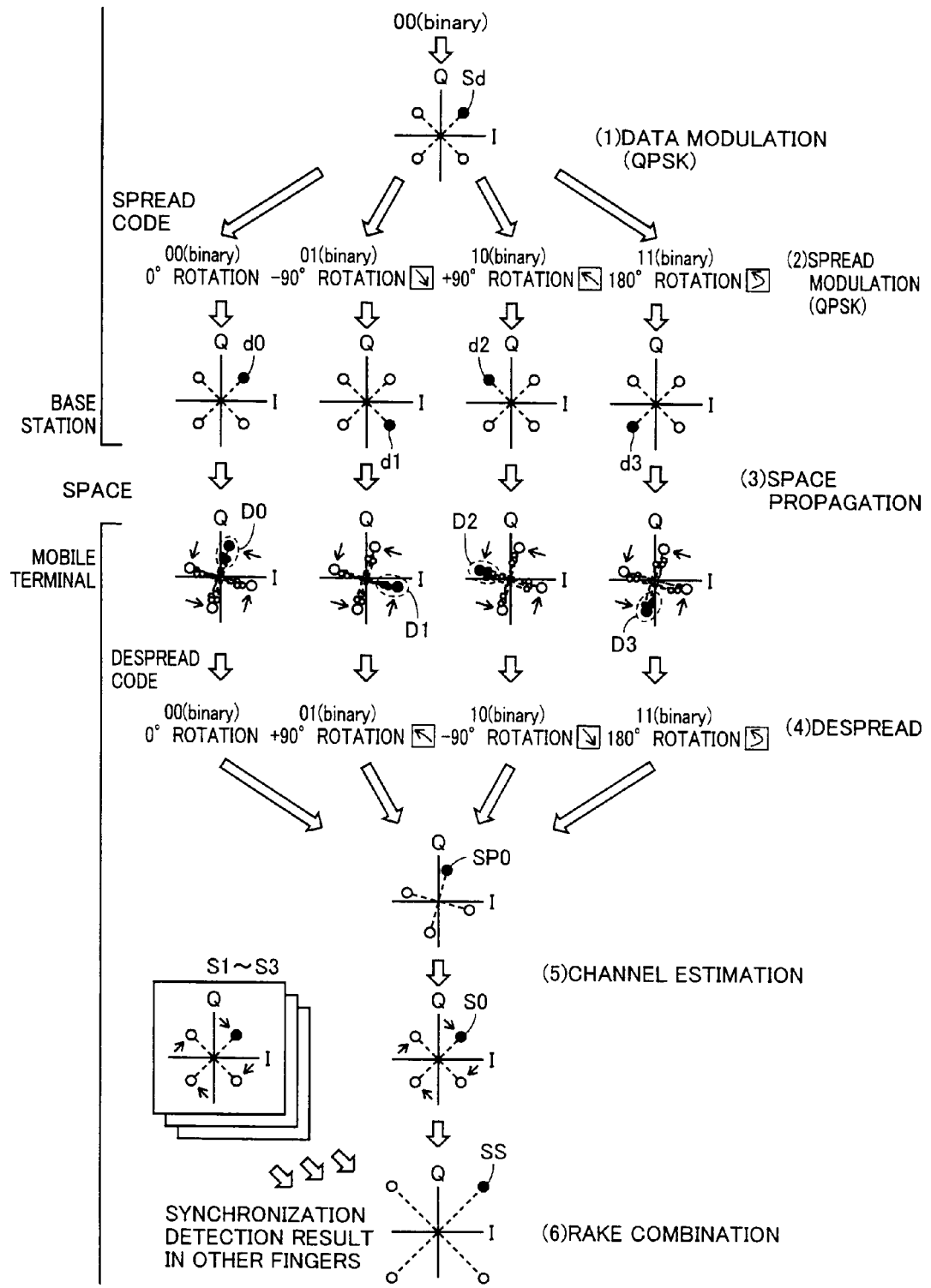
FIG. 1 is a schematic view schematically illustrating an overview of a spread spectrum communication scheme as a background for describing a reception apparatus according to an embodiment of the present invention.

In the following, embodiments of the present invention will be described in detail referring to the drawings. Throughout the drawings, identical or corresponding parts are denoted by the identical reference characters, and description thereof will not be repeated.

Referring to FIG. 1, in the spread spectrum communication, first, (1) data modulation is performed in a base station. As for the data modulation scheme, for example QPSK (Quadrature Phase Shift Keying) scheme is employed. In QPSK scheme, a transmission pilot symbol signal Sd of binary expression "00" is expressed as (1, 1) on IQ coordinates.

Next, in the base station, (2) spread modulation is performed. In the spread spectrum communication, when transmitting certain digital data, N of spread codes generated in time sequence and one transmission data item are multiplied by N times and transmitted for N times. Here, when the value of N is great, the communication rate is reduced; when the value of N is small, the communication rate is increased. In the embodiments of the present invention, the value of N (also referred to as SF (Spreading Factor)) is set as four.

Being processed with "00" spread code, transmission pilot symbol signal Sd becomes a spread chip signal d0 of which phase is rotated by 0°. Being processed with "01" spread code, it becomes a spread chip signal d1 of which phase is rotated by −90°. Being processed with "10" spread code, it becomes a spread chip signal d2 of which phase is rotated by 90°. Being processed with "11" spread code, it becomes a spread chip signal d3 of which phase is rotated by 180°.

Thus, spread chip signals d0-d3 being subjected to spread modulation are sent out from the base station as radio waves, and thereafter attain (3) space propagation. Spread chip signals d0-d3 sent out from the base station as radio waves have their phases changed through fading in space and received as reception chip signals D0-D3 at a mobile terminal (a reception apparatus). Reception chip signals D0-D3 are slightly different from one another in the reception intensity and the amount of phase rotation even when they are the same in the spread code, depending on the magnitude of fading due to the difference in paths from the base station to the mobile terminal.

Reception chip signals D0-D3 are (4) despreaded at the fingers of the mobile terminal. In despreading, reception chip signals D0-D3 are each processed with a despread code corresponding to the spread code. Despreaded reception chip signals D0-D3 are integrated during one symbol, that is, over four chips, and become a reception pilot symbol signal SP0 converged on one point on IQ coordinates.

As shown in FIG. 1, reception pilot symbol signal SP0 does not match transmission pilot symbol signal Sd. Specifically, with reception pilot symbol signal SP0, the phase rotation in the space propagation from the base station to the mobile terminal still remains. By comparing transmission pilot symbol signal Sd and reception pilot symbol signal SP0, the deterioration level of signal intensity and the amount of phase rotation due to space propagation can be estimated (channel estimation).

Accordingly, in the finger of the mobile terminal, the amount of phase rotation (channel estimation value) is calculated through (5) channel estimation. In calculating the amount of phase rotation, for example, a correction coefficient is calculated based on the difference between the coordinate where reception pilot symbol signal SP0 is rotated by −45° and I axis ($\sqrt{2}$, 0) of IQ coordinates. By correcting the phase rotation remaining with reception pilot symbol signal SP0 with the channel estimation value, correction symbol signal S0 is calculated.

In the other fingers also, in the similar manner, the correction symbol signals S1-S3 are calculated. Correction symbol signals S0-S3 thus calculated are subjected to (6) rake combination in the mobile terminal. Correction symbol signals S0-S3 become a combination symbol signal SS through the rake combination. The specific configurations and operations of the mobile terminal (reception apparatus) in the spread spectrum communication described above will be described in detail for each of the following embodiments.

First Embodiment

Figure 2:
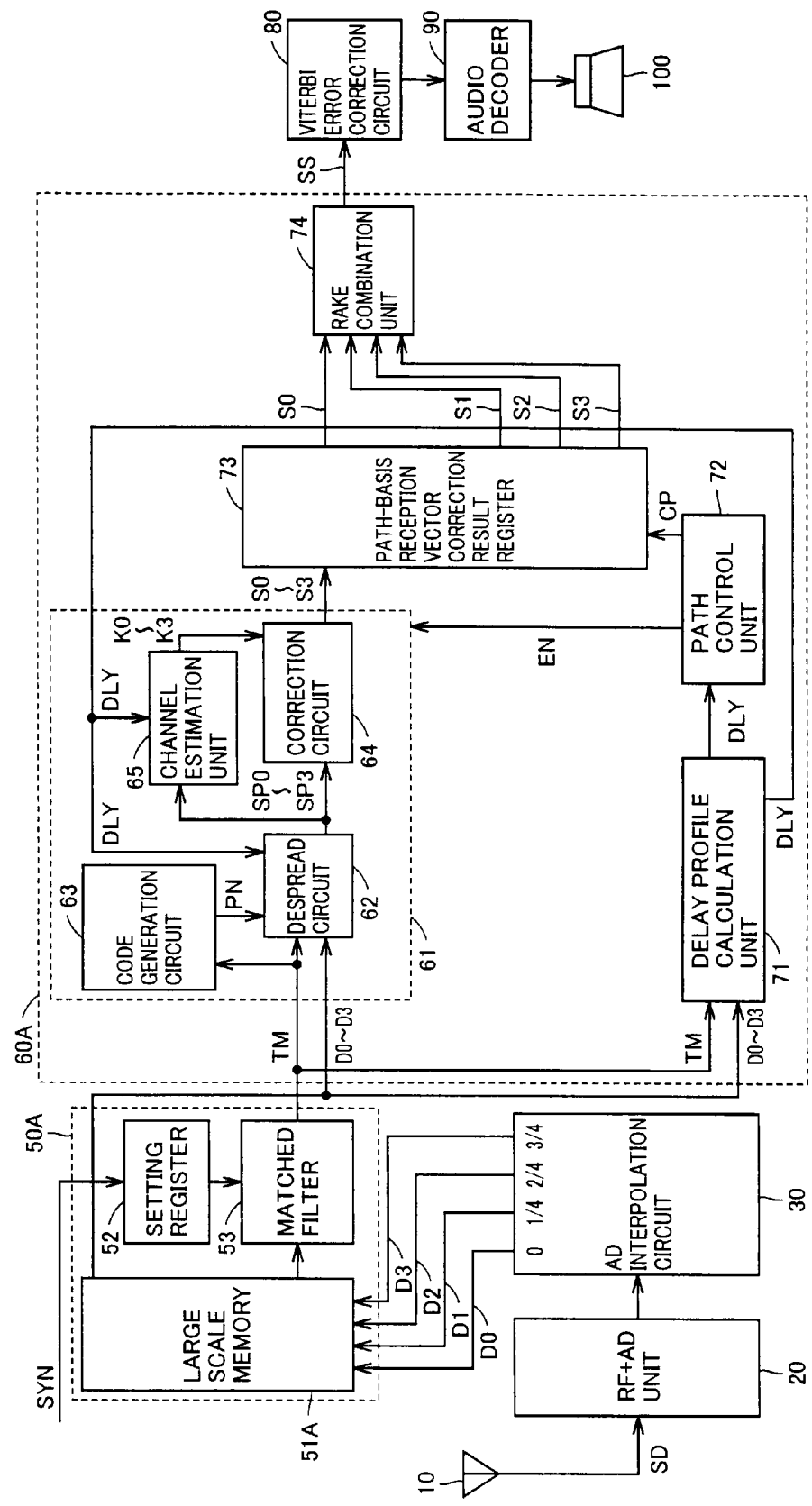
FIG. 2 is a schematic block diagram schematically showing a configuration of a reception apparatus 1A according to a first embodiment of the present invention.

FIG. 2 is a schematic block diagram schematically showing a configuration of a reception apparatus 1A according to a first embodiment of the present invention.

Referring to FIG. 2, reception apparatus 1A of the first embodiment includes an antenna reception unit 10, an RF+AD unit 20, an AD interpolation circuit 30, acquisition unit 50A, spread spectrum demodulation unit 60A, viterbi error correction circuit 80, an audio decoder 90, and a speaker unit 100. Antenna reception unit 10, RF+AD unit 20 and AD interpolation circuit 30 are also generally referred to as an input process unit. Viterbi error correction circuit 80, audio decoder 90 and speaker 100 are also generally referred to as an output process unit.

Acquisition unit 50A includes a large scale memory 51A, a setting register 52 and a matched filter 53. Spread spectrum demodulation unit 60A includes a finger operation unit 61, a delay profile calculation unit 71, a path control unit 72, a path-basis reception vector correction result register 73, and a rake combination unit 74. Finger operation unit 61 has a despread circuit 62, a code generation circuit 63, a correction circuit 64, and a channel estimation unit 65. Delay profile calculation unit 71 and path control unit 72 are also generally referred to as a path calculation process unit.

Reception signal SD received from antenna reception unit 10 is subjected to an RF (Radio Frequency) process and an AD (Analogue to Digital) conversion in RF+AD unit 20, and thereafter outputted to AD interpolation circuit 30. AD interpolation circuit 30 performs interpolation of digital data outputted from RF+AD unit 20, and classifies the digital data into reception chip signals D0-D3 for each spread code. Reception chip signals D0-D3 classified into each spread code are outputted to a large scale memory 51A in acquisition unit 50A.

Large scale memory 51A once stores reception chip signals D0-D3, and thereafter outputs them to matched filter 53 in acquisition unit 50A and to delay profile calculation unit 71 in spread spectrum demodulation unit 60A.

As to the form of large scale memory 51A, while the one such as SRAM (Static Random Access Memory) that allows fast data reading and writing is preferable, DRAM (Dynamic Random Access Memory) is acceptable if it does not largely degrade the processing speed of a series of processes. Additionally, while the capacity of large memory 51A of at least 64 bits×512 words (1 word equals to 64 bits) is adequate, the capacity as large as possible in an economically tolerable range is desirable, including the chip size or the circuit board size. It should be noted that the form of the large scale memory described above applies as well to the large scale memories in other embodiments.

Setting register 52 receives an acquisition signal SYN and outputs it to matched filter 53. Matched filter 53 receives acquisition signal SYN and performs the acquisition of reception chip signals D0-D3 outputted from large scale memory 51A, and outputs a despread timing signal TM to despread circuit 62, code generation circuit 63 and delay profile calculation unit 71 in spread spectrum modulation unit 60A.

As above, in reception apparatus 1A according to the first embodiment shown in FIG. 2, matched filter 53 that has conventionally been arranged in a searcher unit is mounted on acquisition unit 50A together with large scale memory 51A. Thus, it is not necessary to receive despread timing signal TM from a searcher unit any more, resulting in reduction of the circuit scale.

Additionally, matched filter 53 becomes capable of detecting in advance a plurality of acquisition points when despreading, based on acquisition signal SYN and reception chip signals D0-D3 once stored in large scale memory 51A. Thus, even when an instantaneous loss of synchronization occurs, deterioration in data quality in the spread spectrum communication can be avoided. Further, since reception chip signals D0-D3 are once stored in large scale memory 51A, despreading, channel estimation, and correction process described in the following can be performed at once at a high rate.

Code generation circuit 63 receives despread timing signal TM and outputs despread code PN to despread circuit 62. Delay profile calculation unit 71 receives despread timing signal TM and performs sequencing in accordance with the reception intensity or the like of reception chip signals D0-D3, and outputs the result as a delay signal DLY to despread circuit 62, channel estimation unit 65 and path control unit 72. Path control unit 72 receives delay signal DLY and outputs an output timing signal EN and a combination timing signal CP.

Output timing signal EN controls the output timing of the symbol integration in finger operation unit 61. Combination timing signal CP controls the rake combination timing of correction symbol signals S0-S3. Despread circuit 62 receives despread timing signal TM, despread code PN and delay signal DLY, despreads reception chip signals D0-D3, and outputs reception symbol signals SP0-SP3 for each despreaded path to correction circuit 64 and channel estimation unit 65. A specific circuit configuration of despread circuit 62 is described in the following.

Figure 3:
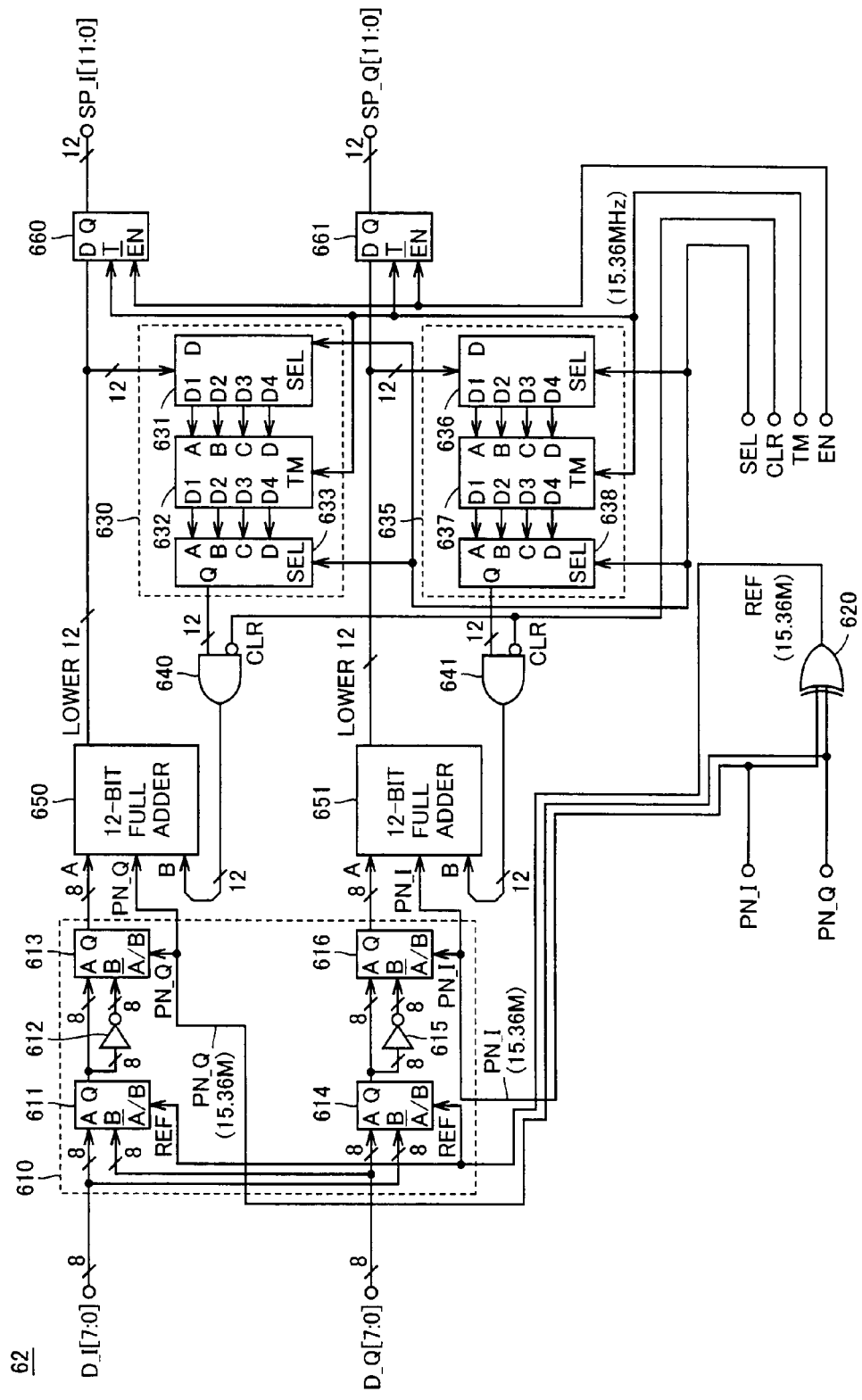
FIG. 3 is a circuit diagram showing specific circuit configuration of a despread circuit 62 according to the first embodiment of the present invention.

FIG. 3 is a circuit diagram showing a specific circuit configuration of despread circuit 62 according to the first embodiment of the present invention.

Referring to FIG. 3, despread circuit 62 according to the first embodiment includes a four-phase multiplier 610, an XOR circuit 620, four-chip integrators 630, 635, AND circuits 640, 641, 12-bit full adders 650, 651, and flip-flop circuits 660, 661. Four-phase multiplier 610 has multiplication operation circuits 611, 613, 614, 616, and inverters 612, 615. Four-chip integrator 630 has integration operation circuits 631, 632, 633. Four-chip integrator 635 has integration operation circuits 636, 637, 638.

Among reception chip signals D0-D3 outputted from large scale memory 51A shown in FIG. 2, I component is expressed as D_I [7:0], and Q component is expressed as D_Q [7:0]. Among despread codes PN outputted from code generation circuit 63 shown in FIG. 2, I component is expressed as PN_I (for example, 15.36 MHz), and Q component is expressed as PN_Q (for example, 15.36 MHz). XOR circuit 620 receives despread codes PN_I, PN_Q and outputs multiplexing reference signal REF (for example, 15.36 MHz).

Multiplication operation circuit 611 receives reception chip signals D_I [7:0], D_Q [7:0] and outputs a signal according to multiplexing reference signal REF. Inverter 612 inverts a signal outputted from multiplication operation circuit 611. Multiplication operation circuit 613 receives the signal outputted from multiplication operation circuit 611 and the inversion signal thereof, and outputs a signal according to despread code PN_Q to 12-bit full adder 650.

Integration operation circuit 631 receives a signal outputted from 12-bit full adder 650 and outputs four signals according to a select signal SEL. Select signal SEL is a signal for switching two multiplexing operations of four-chip integrators 630, 635, and determined according to delay signal DLY outputted from delay profile calculation unit 71 and the like. Integration operation circuit 632 receives four signals outputted from integration operation circuit 631 and outputs four signals according to despread timing signal TM (for example, 15.36 MHz). Integration operation circuit 633 receives four signals outputted from integration operation circuit 632 and outputs a signal according to select signal SEL.

AND circuit 640 receives an inversion signal of a clear clock signal CLR and a signal outputted from integration operation circuit 633, and outputs a signal to 12-bit full adder 650. Clear clock signal CLR resets a symbol integration result integrated by four-chip integrators 630, 635.

12-bit full adder 650 receives a signal outputted from multiplication operation circuit 613 and AND circuit 640, and outputs a signal according to despread code PN_Q to integration operation circuit 631 and flip-flop circuit 660. 12-bit full adder 650 adds input data of chip unit and symbolize it. Flip-flop circuit 660 receives a signal outputted from 12-bit full adder 650 and outputs I component SP_I [11:0] of a reception symbol signal according to despread timing signal TM and output enable signal EN.

Multiplication operation circuit 614 receives reception chip signals D_I[7:0], D_Q[7:0] and outputs a signal according to multiplexing reference signal REF. Inverter 615 inverts a signal outputted from multiplication operation circuit 614. Multiplication operation circuit 616 receives the signal outputted from multiplication operation circuit 614 and the inversion signal thereof, and outputs a signal according to despread code PN_I to 12-bit full adder 651.

Integration operation circuit 636 receives a signal outputted from 12-bit full adder 651 and outputs four signals according to select signal SEL. Integration operation circuit 637 receives four signals outputted from integration operation circuit 636 and outputs four signals according to despread timing signal TM (for example, 15.36 MHz). Integration operation circuit 638 receives four signals outputted from integration operation circuit 637 and outputs a signal according to select signal SEL.

AND circuit 641 receives an inversion signal of clear clock signal CLR and a signal outputted from integration operation circuit 638, and outputs a signal to 12-bit full adder 651. 12-bit full adder 651 receives a signal outputted from multiplication operation circuit 616 and AND circuit 641, and outputs a signal according to despread code PN_I to integration operation circuit 636 and flip-flop circuit 661. Flip-flop circuit 661 receives a signal outputted from 12-bit full adder 651 and outputs Q component SP_Q [11:0] of a reception symbol signal according to despread timing signal TM and output enable signal EN.

Referring back to FIG. 2, channel estimation unit 65 receives reception symbol signals SP0-SP3 and delay signal DLY, performs the channel estimation of reception symbol signals SP0-SP3, and outputs correction coefficients K0-K3 to correction circuit 64. Correction circuit 64 receives correction coefficients K0-K3, corrects phase rotation of reception symbol signals SP0-SP3 due to fading, and outputs correction symbol signals S0-S3 to path-basis reception vector correction result resistor 73. Path-basis reception vector correction result resistor 73 outputs correction symbol signals S0-S3 to rake combination unit 74 according to combination timing signal CP.

Rake combination unit 74 performs the rake combination of correction symbol signals S0-S3, and outputs combination symbol signal SS to viterbi error correction circuit 80. As above, by combining large scale memory 51A and finger operation unit 61, the demodulation process that is not dependent on the reception rate of reception signal SD received from antenna reception unit 10 is realized.

Viterbi error correction circuit 80 (decode unit) performs a viterbi error correction of combination symbol signal SS. Audio decoder 90 decodes a signal outputted from viterbi error correction circuit 80 to an audio signal or the like. The signal decoded to an audio signal is outputted from speaker unit 100 as audio data.

Figure 4:
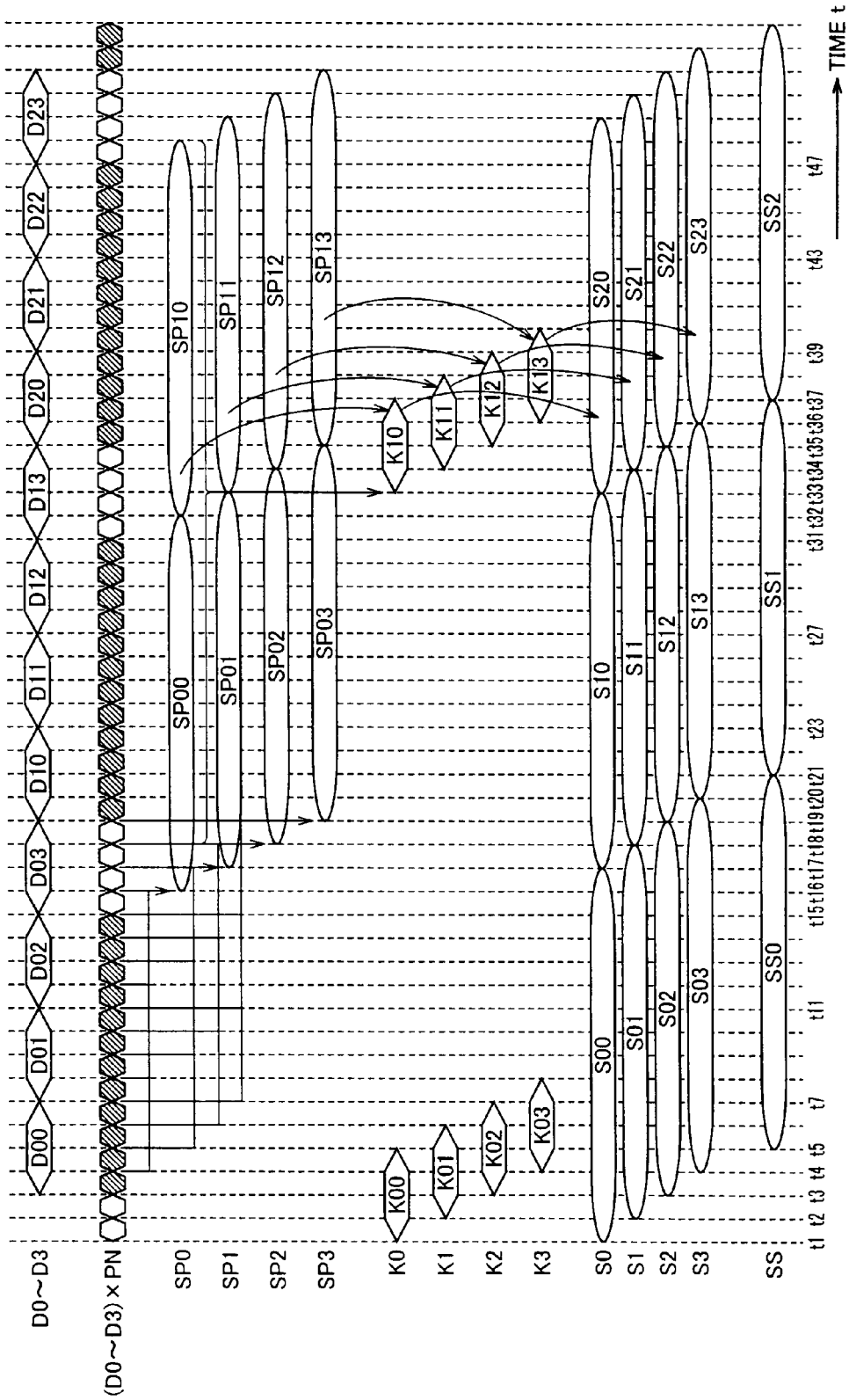
FIG. 4 is an operation waveform diagram for describing a circuit operation of reception apparatus 1A according to the first embodiment of the present invention.

FIG. 4 is an operation waveform diagram for describing a circuit operation of reception apparatus 1A of the first embodiment of the present invention.

Referring to FIG. 4, reception chip signals D0-D3 outputted from AD interpolation circuit 30 shown in FIG. 2 are successively written to large scale memory 51A shown in FIG. 2 with chip intervals of D00, D01 . . . . As described referring to FIG. 1, reception chip signals D0-D3 are slightly different from one another in the reception intensity and the amount of phase rotation even when they are the same in the spread code, depending on the magnitude of fading due to the difference in paths from the base station to the mobile terminal. This will be described referring to FIG. 5.

Figure 5:
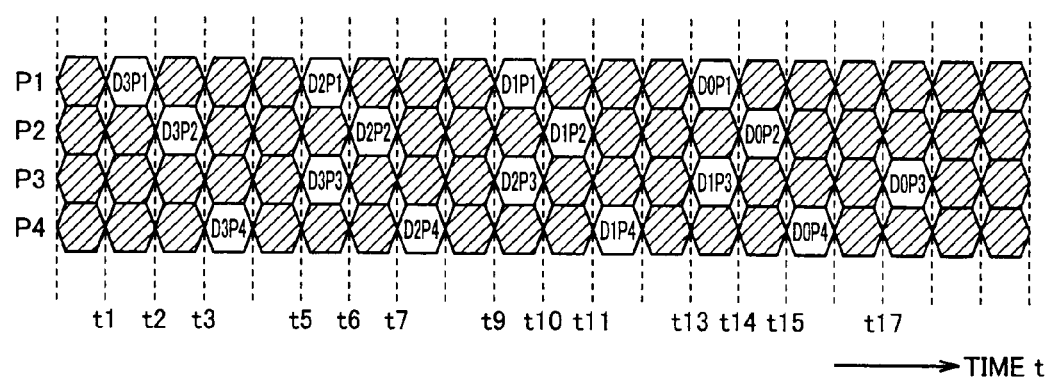
FIG. 5 is an operation waveform diagram showing how reception chip signals D0-D3 are written in a large scale memory 51A depending on the difference in paths.

FIG. 5 is an operation waveform diagram showing how reception chip signals D0-D3 are written to a large scale memory 51A depending on the difference in paths.

Referring to FIG. 5, reception chip signal group P1 indicates signals that are received through a first path (path 1). Reception chip signal group P2 indicates signals that are received through a second path (path 2). Reception chip signal group P3 indicates signals that are received through a third path (path 3). Reception chip signal group P4 indicates signals that are received through a fourth path (path 4).

In reception chip signal group P1, reception chip signal D3P1 is a signal subjected to a spread code of 180° rotation. Reception chip signal D2P1 is a signal subjected to a spread code of −90° rotation. Reception chip signal D1P1 is a signal subjected to a spread code of +90° rotation. Reception chip signal D0P1 is a signal subjected to a spread code of 0° rotation. The other reception signal groups P2-P4 are similarly coded.

Referring to FIG. 5, at time point t1, reception chip signal D3P1 is written to large scale memory 51A. At time point t2, reception chip signal D3P2 is written to large scale memory 51A. At time point t3, reception chip signal D3P4 is written to large scale memory 51A. At time point t5, reception chip signal D3P3 is written to large scale memory 51A. Thus, with respect to reception chip signals subjected to the same spread code of 180° rotation, the distance of the path is increased in the order of path 1, path 2, path 4, path 3, by which arrival to reception apparatus 1A is delayed. This applies as well to other reception chip signals subjected to other spread codes.

Next, from the viewpoint of the reception intensity, as reception chip signal D3P1 arrives at reception apparatus 1A through the shortest path, it is assumed that the signal arrives as a direct wave. On the other hand, reception chip signals D3P2-D3P4 do not arrive at reception apparatus 1A through the shortest path, it is assumed that the signals arrive as reflected waves. As compared to the direct wave, in the reflected waves, the signals received are weak and the amounts of phase rotation are different slightly from one another. Referring to FIG. 1, reception chip signals D0-D3 on IQ coordinates after (3) space propagation indicate this state (referred to as constellation).

In finger operation unit 61 shown in FIG. 2, first, reception chip signals D0P1-D0P4 subjected to spread code of 0° rotation are successively read in the order of arrival at reception apparatus 1A to be subjected to despreading, channel estimation and correction process. Next, reception chip signals D1P1-D1P4 subjected to spread code of +90° rotation are successively read in the order of arrival at reception apparatus 1A to be subjected to despreading, channel estimation and correction process. Next, reception chip signals D2P1-D2P4 subjected to spread code of −90° rotation are successively read in the order of arrival at reception apparatus 1A to be subjected to despreading, channel estimation and correction process. Next, reception chip signals D3P1-D3P4 subjected to spread code of 180° rotation are successively read in the order of arrival at reception apparatus 1A to be subjected to despreading, channel estimation and correction process. The operation processes in the finger operation unit such as despreading, channel estimation and correction process are also generally referred to as a finger operation process.

Referring back to FIG. 4, reception chip signals D0-D3 are once stored in matched filter 53 shown in FIG. 2, and thereafter in despread circuit 62 shown in FIG. 2, they are despreaded by despread codes PN outputted from code generation circuit 63 shown in FIG. 2. The despreaded reception chip signals (D0-D3)×PN are integrated during one symbol, over four chips, and outputted from despread circuit 62 as reception chip signals SP0-SP3 for each path.

Reception symbol signals SP0-SP3 are inputted to channel estimation unit 65 and correction circuit 64 shown in FIG. 2. Channel estimation unit 65 rotates reception symbol signals SP0-SP3 by −45° and subsequently integrates them during two symbols, and measures a deviation from 1 axis in IQ coordinates and a distortion amount. Thus calculated correction coefficients K0-K3 are updated by two symbol intervals, and outputted to correction circuit 64. Correction circuit 64 receives correction coefficients K0-K3, and corrects the amount of phase rotation of reception symbol signals SP0-SP3 by complex operation, and outputs correct symbol signals S0-S3.

Correct symbol signals S0-S3 are once held in path-basis reception vector correction result resister 73 shown in FIG. 2, and thereafter they are subjected to the rake combination to be combination symbol signal SS in rake combination unit 74 shown in FIG. 2. Thus, by the rake combination of correction symbol signals S0-S3, the signal value intensity of combination symbol signal SS is enhanced.

As above, according to the first embodiment, matched filter 53 that has conventionally been arranged in a searcher unit is mounted on acquisition unit 50A together with large scale memory 51A, whereby the circuit scale and the time require for acquisition can be reduced.

Second Embodiment

Figure 6:
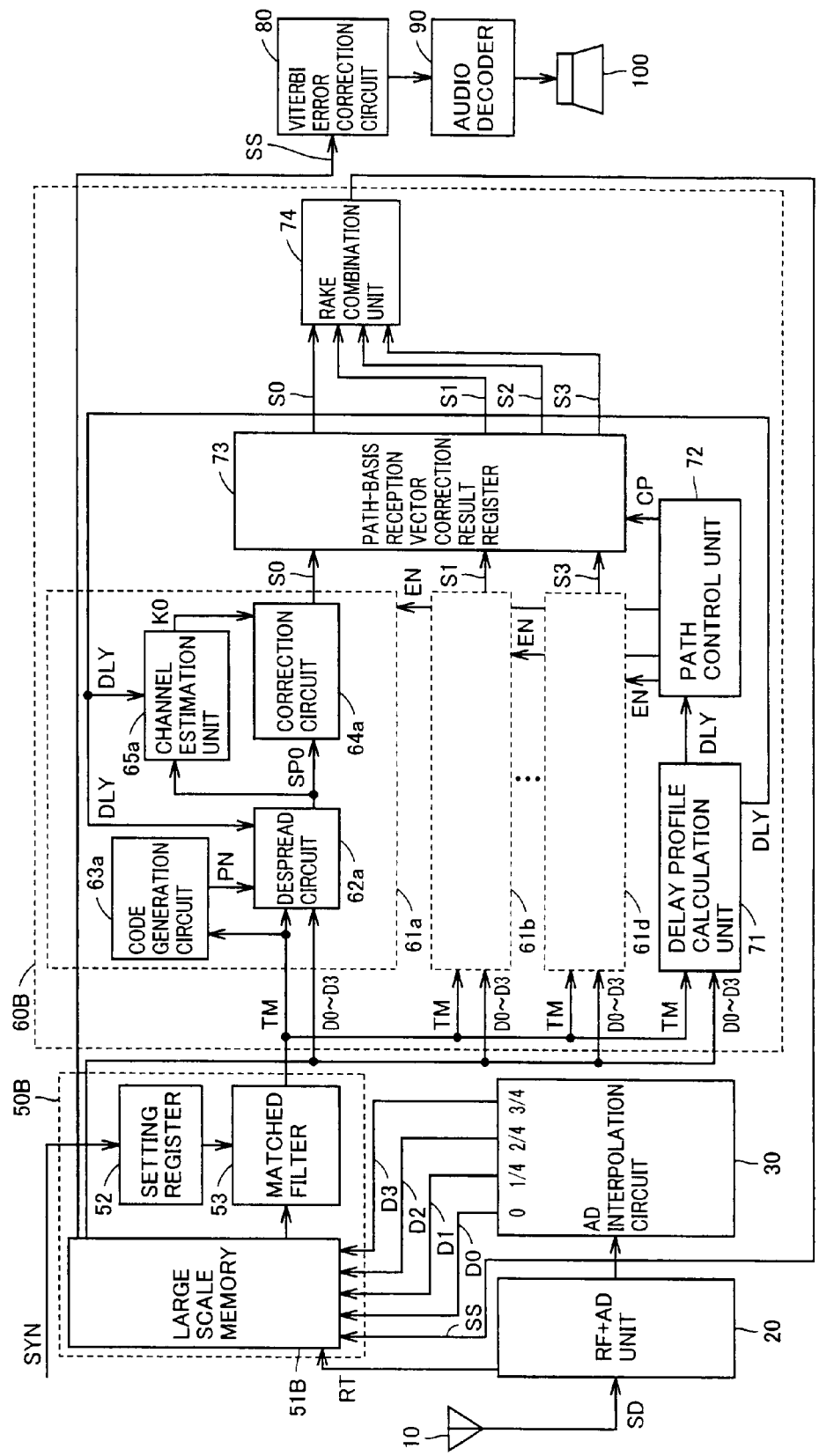
FIG. 6 is a schematic block diagram schematically showing a configuration of a reception apparatus 1B according to a second embodiment of the present invention.

FIG. 6 is a schematic block diagram schematically showing a configuration of a reception apparatus 1B according to a second embodiment of the present invention.

Referring to FIG. 6, reception apparatus 1B according to the second embodiment is different from reception apparatus 1A according to the first embodiment in that acquisition unit 50A is replaced by an acquisition unit 50B, and spread spectrum demodulation unit 60A is replaced by a spread spectrum demodulation unit 60B.

Acquisition unit 50B is different from acquisition unit 50A according to the first embodiment only in that large scale memory 51A is replaced by a large scale memory 51B. Accordingly, description of the common parts is not repeated herein. Spread spectrum demodulation unit 60B is different from spread spectrum demodulation unit 60A according to the first embodiment only in that finger operation unit 61 is replaced by finger operation units 61a-61d. Accordingly, description of the common parts is not repeated herein.

The circuit configuration of each of finger operation units 61a-61d is the same as that of finger operation unit 61 of the first embodiment. Accordingly, in order to save space, the circuit configuration of each of finger operation units 61a-61d is not shown in FIG. 6.

Finger operation unit 61 according to the first embodiment sequentially processes all reception chip signals D0-D3 subjected to different spread codes in time sequence (time division multiplexing). On the other hand, according to the second embodiment, reception signals D0-D3 are processed by different finger operation units 61a-61d for each path through which the signals are arriving at reception apparatus 1B.

Specifically, finger operation unit 61a processes reception chip signals D0-D3 received through a first path (path 1). Finger operation unit 61b processes reception chip signals D0-D3 received through a second path (path 2). Finger operation unit 61c processes reception chip signals D0-D3 received through a third path (path 3). Finger operation unit 61d processes reception chip signals D0-D3 received through a fourth path (path 4).

Thus, by processing reception chip signals D0-D3 by different finger operation units 61a-61d for each path through which the signals are arriving at reception apparatus 1B, spread spectrum demodulation unit 60B can attain fast parallel operations of despreading, channel estimation and correction process of reception chip signals D0-D3. When the number of finger operation units is set as four as finger operation units 61a-61d of the second embodiment, the aforementioned processing speed is approximately quadrupled. It should be noted that the number of finger operation units 61a-61d can be changed freely in accordance with the number of expected paths.

Path-basis reception vector correction result register 73 receives reception symbol signals SP0-SP3 for each path outputted from respective finger operation units 61a-61d, and outputs correction symbol signals S0-S3 to rake combination unit 74 in accordance with combination timing signal CP. Rake combination unit 74 performs the rake combination of correction symbol signals S0-S3, and outputs combination symbol signal SS to large scale memory 51B.

The processing speed of spread spectrum demodulation unit 60B is approximately quadrupled as compared to the first embodiment. Accordingly, the demodulation rate of spread spectrum demodulation unit 60B is approximately four times as fast as the reception rate of reception signal SD received at antenna reception unit 10. As a result, combination symbol signal SS outputted from rake combination unit 74 becomes an intermittent signal.

Accordingly, large scale memory 51B of the second embodiment once stores reception chip signals D0-D3 and temporarily holds combination symbol signal SS. Large scale memory 51B receives reception rate signal RT outputted from RF+AD unit 20 and restores the held combination symbol signal SS to the reception rate of reception signal SD, and outputs it to viterbi error correction circuit 80.

Thus, through large scale memory 51B, by restoring combination symbol signal SS from the modulation rate of spread spectrum demodulation unit 60B to the reception rate of reception signal SD, the imbalance between the modulation rate and the reception rate can be adjusted.

Figure 7:
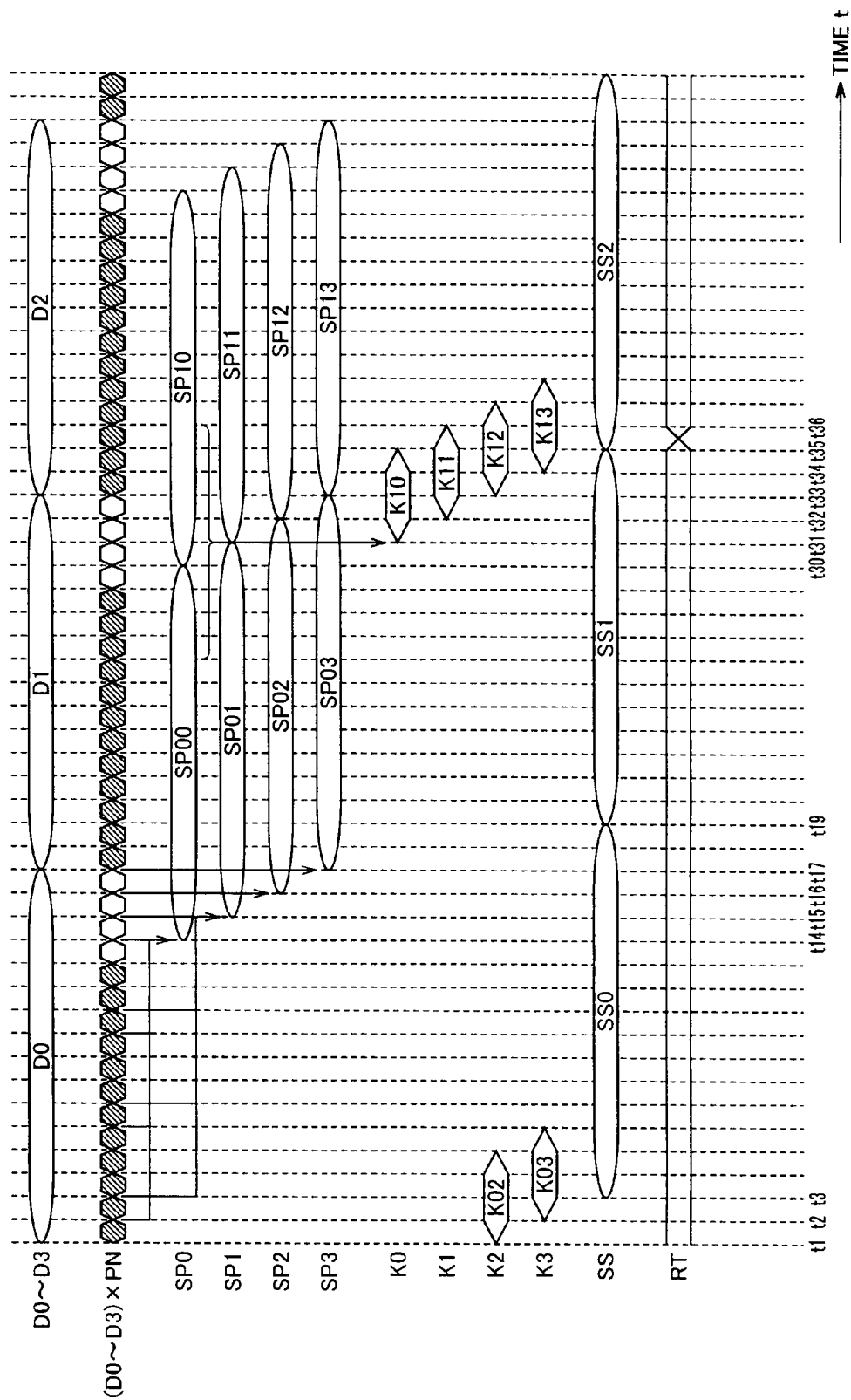
FIG. 7 is an operation waveform diagram for describing a circuit operation of reception apparatus 1B according to the second embodiment of the present invention.

FIG. 7 is an operation waveform diagram for describing a circuit operation of the reception apparatus 1B according to the second embodiment of the present invention.

Referring to FIG. 7, reception chip signals D0-D3 outputted from AD interpolation circuit 30 shown in FIG. 6 are sequentially written to large scale memory 51B shown in FIG. 6 with chip intervals of D0, D1, . . . . The chip intervals D0, D1, . . . of reception signals are longer as compared to the first embodiment. It means that the operation numbers of despreading in one chip time is quadrupled as compared to the first embodiment.

Reception chip signals D0-D3 are once stored in matched filter 53 shown in FIG. 6, and thereafter each outputted to despread circuits 62a-62d shown in FIG. 6 (only despread circuit 62a is shown) for each different spread code. Reception chip signals D0-D3 each outputted to despread circuits 62a-62d are despreaded by despread codes PN each outputted from code generation circuits 63a-63d shown in FIG. 6 (only code generation circuit 63a is shown). The despreaded reception chip signals (D0-D3)×PN are integrated during one symbol, over four chips, and thereafter respectively outputted from despread circuits 62a-62d as reception symbol signals SP0-SP3 for each path.

Reception symbol signals SP0-SP3 are inputted to channel estimation units 65a-65d (only channel estimation unit 65a is shown) and correction circuits 64a-64d (only correction circuit 64a is shown) shown in FIG. 6.

Channel estimation units 65a-65d respectively rotate reception symbol signals SP0-SP3 by −45° and thereafter integrate them during two symbols, and measure a deviation from I axis in IQ coordinates and a distortion amount. Thus calculated correction coefficients K0-K3 are updated by two symbol intervals, and respectively outputted to correction circuits 64a-64d. Correction circuits 64a-64d receive correction coefficients K0-K3 and correct the amount of phase rotation of reception symbol signals SP0-SP3 by complex operation, respectively, and output them to rake combination unit 74 shown in FIG. 6 through path-basis reception vector correction result register 73 shown in FIG. 6.

Rake combination unit 74 performs the rake combination of the signals outputted through path-basis reception vector correction result register 73 (correction symbol signals S0-S3), and outputs combination symbol signal SS to large scale memory 51B shown in FIG. 6. Large scale memory 51B restores combination symbol signal SS from the demodulation rate to the reception rate in accordance with reception rate signal RT outputted from RF+AD unit 20 shown in FIG. 6.

As above, according to the second embodiment, by replacing finger operation unit 61 by finger operation units 61a-61d and outputting combination symbol signal SS through large scale memory 51B, demodulation process can be made fast without changing the reception rate.

Third Embodiment

Figure 8:
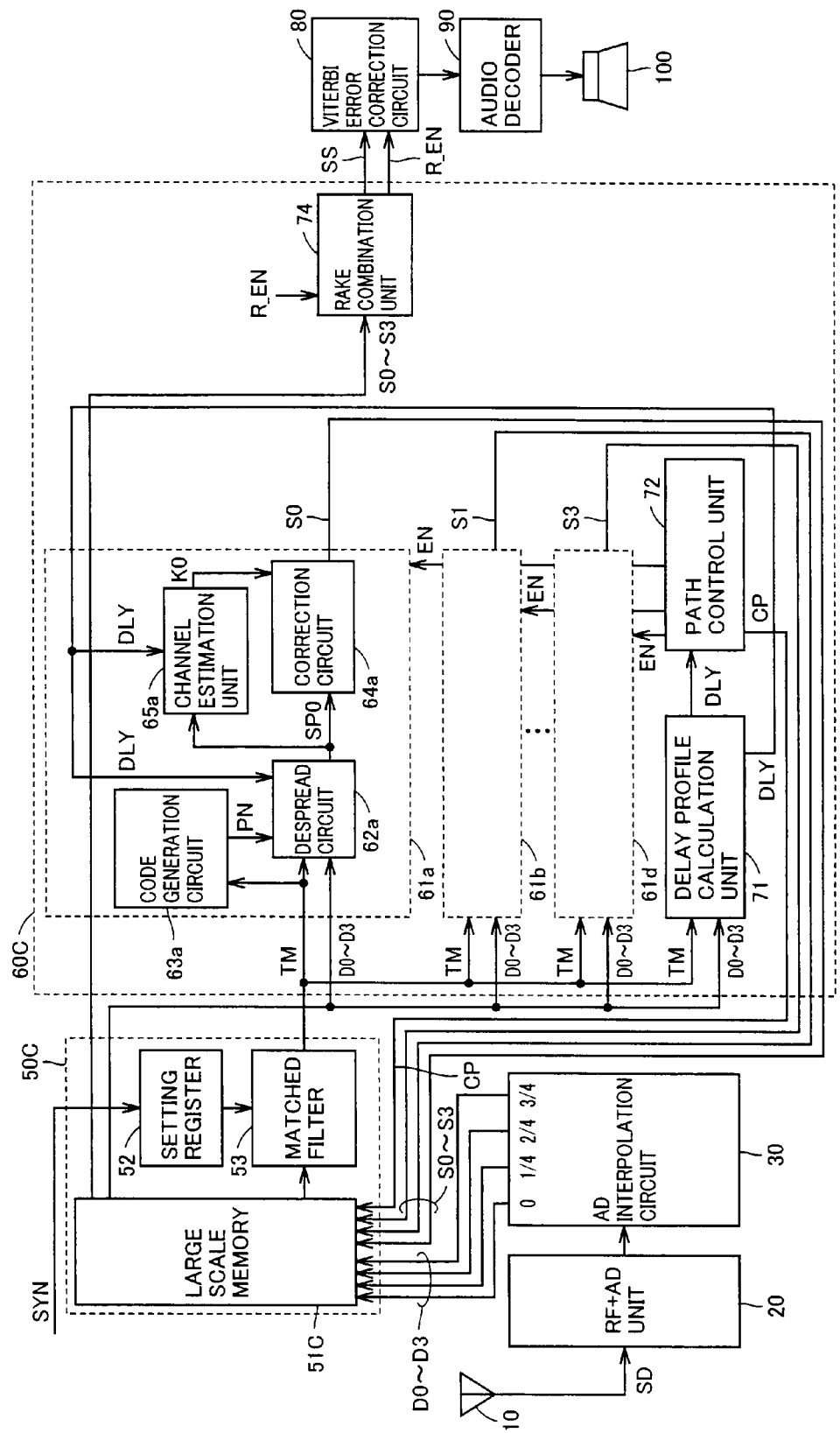
FIG. 8 is a schematic block diagram schematically showing a configuration of a reception apparatus 1C according to a third embodiment of the present invention.

FIG. 8 is a schematic block diagram schematically showing a configuration of a reception apparatus 1C according to a third embodiment of the present invention.

Referring to FIG. 8, reception apparatus 1C according to the third embodiment is different from reception apparatus 1B according to the second embodiment in that acquisition unit 50B is replaced by an acquisition unit 50C, and spread spectrum demodulation unit 60B is replaced by a spread spectrum demodulation unit 60C.

Acquisition unit 50C is different from acquisition unit 50B according to the second embodiment only in that large scale memory 51B is replaced by a large scale memory 51C. Accordingly, description of the common parts is not repeated herein. Spread spectrum demodulation unit 60C is different from spread spectrum demodulation unit 60B according to the second embodiment only in that path-basis reception vector correction result register 73 is removed. Accordingly, description of the common parts is not repeated herein.

In the third embodiment, correction circuits 64a-64d output correction symbol signals S0-S3 having each phase rotation due to fading corrected to large scale memory 51C. Path control unit 72 outputs combination timing signal CP that controls the rake combination timing of correction symbol signals S0-S3 to large scale memory 51C.

Large scale memory 51C once stores reception chip signals D0-D3 and temporarily holds correction symbol signals S0-S3 respectively outputted from finger operation units 61a-61d. Correction symbol signals S0-S3 held in large scale memory 51C are subjected to adjustment for restoring from the modulation rate to the reception rate or the like in accordance with combination timing signal CP, and thereafter outputted to rake combination unit 74. Rake combination unit 74 performs the rake combination of correction symbol signals S0-S3 in accordance with rake combination valid signal R_EN that indicates a valid period of rake combination, and outputs combination symbol signal SS and rake combination valid signal R_EN to viterbi error correction circuit 80.

Thus, by removing path-basis reception vector correction result register 73 and outputting correction symbol signals S0-S3 to rake combination unit 74 through large scale memory 51C, imbalance between the modulation rate and the reception rate can be adjusted and the circuit scale can be reduced.

Figure 9:
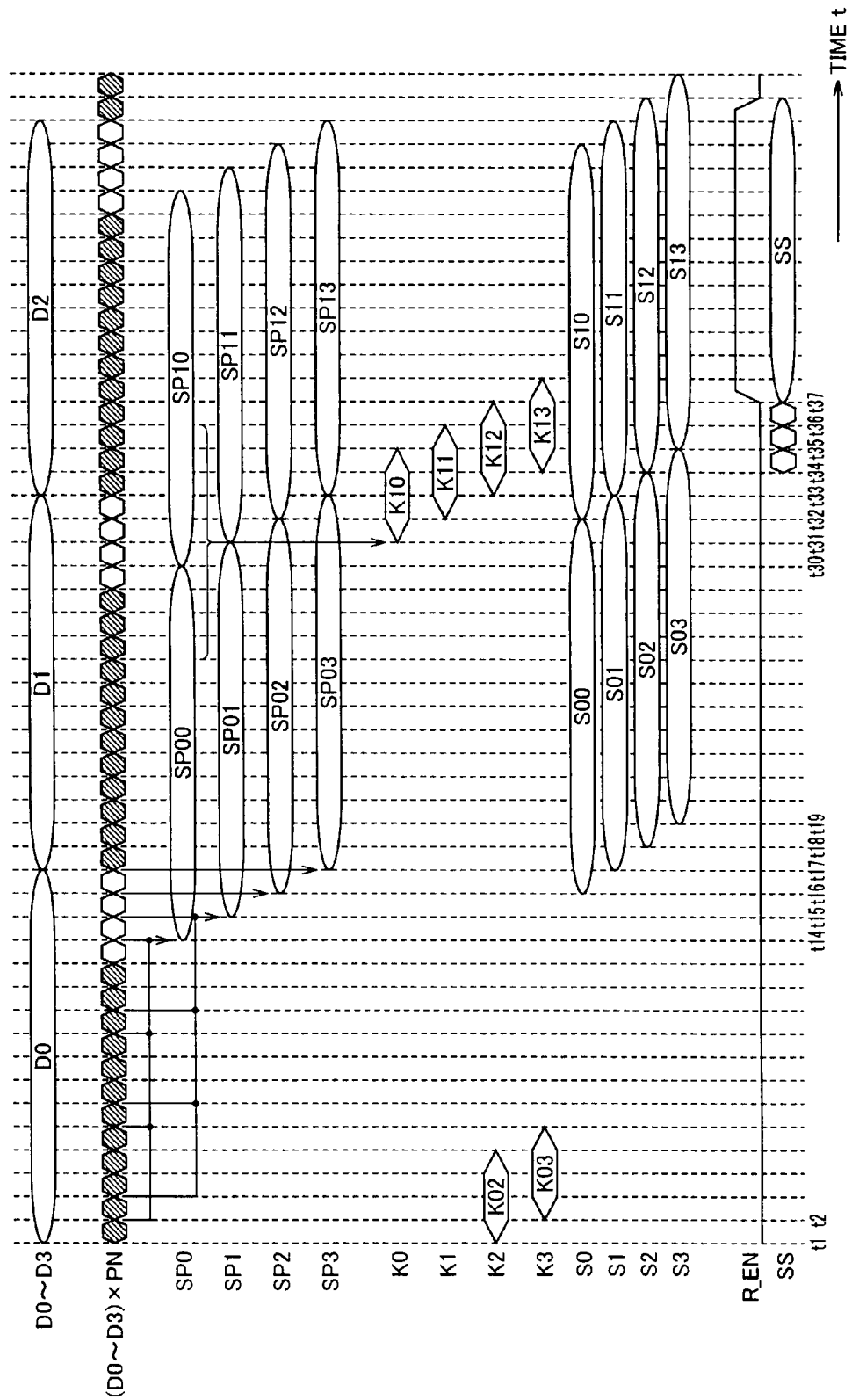
FIG. 9 is an operation waveform diagram for describing a circuit operation of reception apparatus 1C according to the third embodiment of the present invention.

FIG. 9 is an operation waveform diagram for describing a circuit operation of reception apparatus 1C according to the third embodiment of the present invention.

Referring to FIG. 9, reception chip signals D0-D3 outputted from AD interpolation circuit 30 shown in FIG. 8 are sequentially written to large scale memory 51C shown in FIG. 8 with chip intervals of D0, D1, . . . . Reception chip signals D0-D3 are once stored in matched filter 53 shown in FIG. 8, and thereafter each outputted to despread circuits 62a-62d shown in FIG. 8 (only despread circuit 62a is shown) for each different spread code. Reception chip signals D0-D3 each outputted to despread circuits 62a-62d are despreaded by despread codes PN each outputted from code generation circuits 63a-63d shown in FIG. 8 (only code generation circuit 63a is shown).

The despreaded reception chip signals (D0-D3)×PN are integrated during one symbol, over four chips, and thereafter respectively outputted from despread circuits 62a-62d as reception symbol signals SP0-SP3 for each path. Reception symbol signals SP0-SP3 are inputted to channel estimation units 65a-65d (only channel estimation unit 65a is shown) and correction circuits 64a-64d (only correction circuit 64a is shown) shown in FIG. 8.

Channel estimation units 65a-65d respectively rotate reception symbol signals SP0-SP3 by −45° and thereafter integrate them during two symbols, and measure a deviation from 1 axis in IQ coordinates and a distortion amount. Thus calculated correction coefficients K0-K3 are updated by two symbol intervals, and respectively outputted to correction circuits 64a-64d. Correction circuits 64a-64d receive correction coefficients K0-K3 and correct the amount of phase rotation of reception symbol signals SP0-SP3 by complex operation, respectively, and output correct symbol signals S0-S3 to large scale memory 51C shown in FIG. 8.

Large scale memory 51C performs adjustment or the like for restoring correction symbol signals S0-S3 from the demodulation rate to the reception rate in accordance with combination timing signal CP, and thereafter outputs them to rake combination unit 74 shown in FIG. 8. Rake combination unit 74 performs the rake combination of correction symbol signals S0-S3 in accordance with rake combination valid signal R_EN that indicates a valid period of rake combination, and outputs combination symbol signal SS. Combination symbols signal SS is outputted together with rake combination valid signal R_EN, and differentiated from a signal in an invalid period (time points t34-t37) of combination symbol signal SS.

As above, according to the third embodiment, by removing path-basis reception vector correction result register 73 and outputting correction symbol signals S0-S3 to rake combination unit 74 through large scale memory 51C, imbalance between the modulation rate and the reception rate can be adjusted and the circuit scale can be reduced.

Fourth Embodiment

Figure 10:
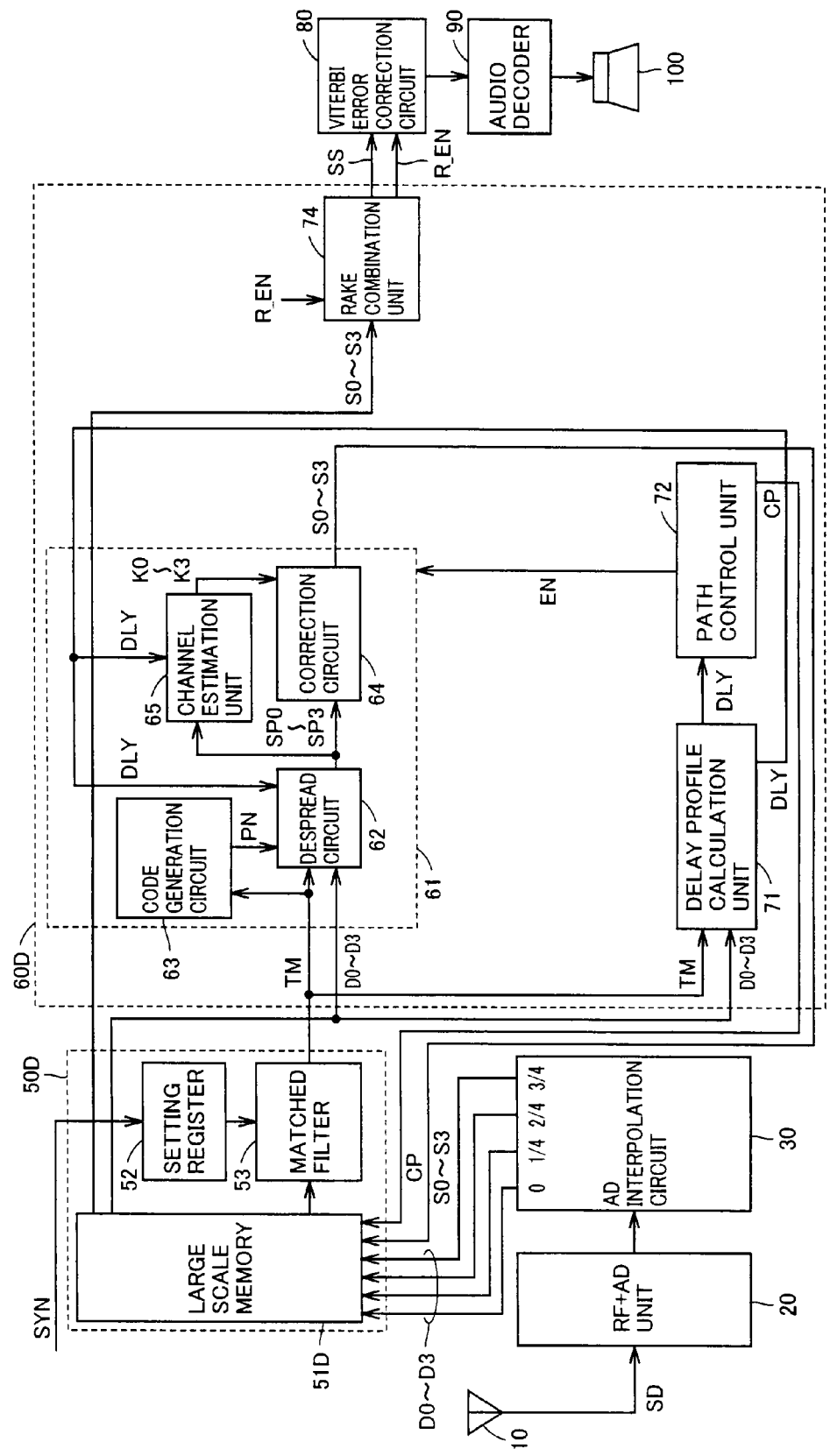
FIG. 10 is a schematic block diagram schematically showing a configuration of a reception apparatus 1D according to a fourth embodiment of the present invention.

FIG. 10 is a schematic block diagram schematically showing a configuration of a reception apparatus 1D according to a fourth embodiment of the present invention.

Referring to FIG. 10, reception apparatus 1D according to the fourth embodiment is different from reception apparatus 1C according to the third embodiment in that acquisition unit 50C is replaced by an acquisition unit 50D, and spread spectrum demodulation unit 60C is replaced by a spread spectrum demodulation unit 60D.

Acquisition unit 50D is different from acquisition unit 50C according to the third embodiment only in that large scale memory 51C is replaced by a large scale memory 51D. Accordingly, description of the common parts is not repeated herein. Spread spectrum demodulation unit 60D is different from spread spectrum demodulation unit 60C according to the third embodiment only in that finger operation units 61a-61d are replaced by finger operation unit 61 as in the first embodiment. Accordingly, description of the common parts is not repeated herein.

In the fourth embodiment, correction circuit 64 of finger operation unit 61 outputs correction symbol signals S0-S3 having each phase rotation due to fading corrected to large scale memory 51D. Path control unit 72 outputs combination timing signal CP that controls the rake combination timing of correction symbol signals S0-S3 to large scale memory 51D.

Large scale memory 51D once stores reception chip signals D0-D3 and temporarily holds correction symbol signals S0-S3 outputted from finger operation unit 61. Correction symbol signals S0-S3 held in large scale memory 51D are outputted to rake combination unit 74 in accordance with combination timing signal CP. Rake combination unit 74 performs the rake combination of correction symbol signals S0-S3 in accordance with rake combination valid signal R_EN that indicates a valid period of rake combination, and outputs combination symbol signal SS and rake combination valid signal R_EN to viterbi error correction circuit 80.

Thus, by restoring finger operation units 61a-61d to finger operation unit 61 as in the first embodiment, the circuit scale can still be reduced as compared to the third embodiment.

Figure 11:
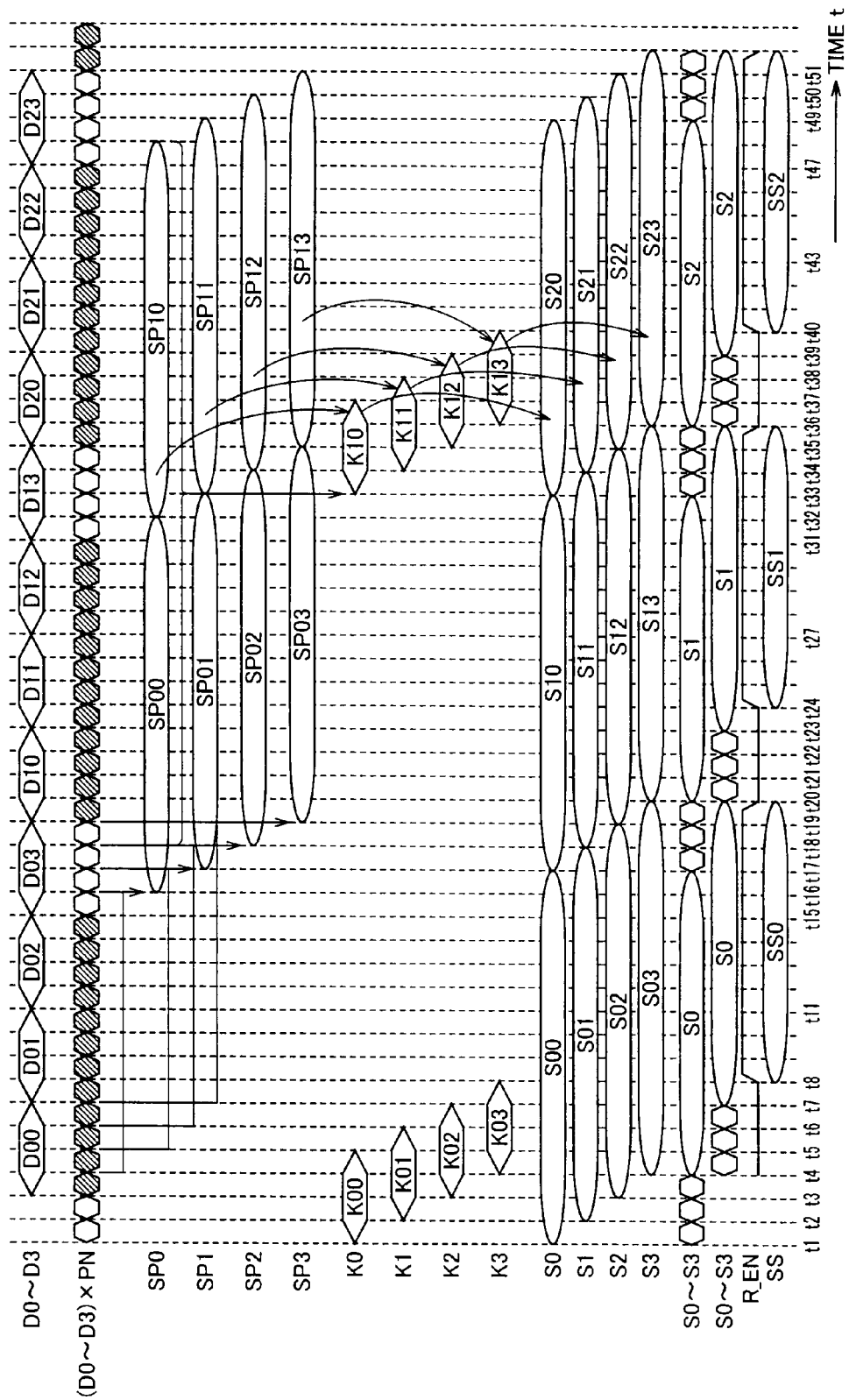
FIG. 11 is an operation waveform diagram for describing a circuit operation of reception apparatus 1D according to the fourth embodiment of the present invention.

FIG. 11 is an operation waveform diagram for describing a circuit operation of reception apparatus 1D according to the fourth embodiment of the present invention.

Referring to FIG. 11, reception chip signals D0-D3 outputted from AD interpolation circuit 30 shown in FIG. 10 are sequentially written to large scale memory 51D shown in FIG. 10 with chip intervals of D0, D1, . . . . Reception chip signals D0-D3 are once stored in matched filter 53 shown in FIG. 10, and thereafter outputted to despread circuit 62 shown in FIG. 10. Reception chip signals D0-D3 outputted to despread circuit 62 are despreaded by despread codes PN each outputted from code generation circuit 63 shown in FIG. 10.

The despreaded reception chip signals (D0-D3)×PN are integrated during one symbol, over four chips, and thereafter outputted from despread circuit 62 as reception symbol signals SP0-SP3 for each path. Reception symbol signals SP0-SP3 are inputted to channel estimation unit 65 and correction circuit 64 shown in FIG. 10.

Channel estimation unit 65 rotates reception symbol signals SP0-SP3 by −45° and thereafter integrates them during two symbols, and measures a deviation from 1 axis in IQ coordinates and a distortion amount. Thus calculated correction coefficients K0-K3 are updated by two symbol intervals, and outputted to correction circuit 64. Correction circuit 64 receives correction coefficients K0-K3 and corrects the amount of phase rotation of reception symbol signals SP0-SP3 by complex operation, and outputs correct symbol signals S0-S3 to large scale memory 51D shown in FIG. 10.

Large scale memory 51D adjusts the output timing of correction symbol signals S0-S3 in accordance with combination timing signal CP, and thereafter outputs them to rake combination unit 74 shown in FIG. 10. FIG. 11 shows correction symbol signals S0-S3 before and after inputted/outputted to/from large scale memory 51D. Rake combination unit 74 removes signals in invalid periods (time points t4-t7 and the like) of correction symbol signals S0-S3 in accordance with rake combination valid signal R_EN that indicates a valid period of rake combination, thereafter performs the rake combination of correction symbol signals S0-S3, and outputs combination symbol signal SS.

As above, according to the fourth embodiment, by restoring finger operation units 61a-61d to finger operation unit 61 as in the first embodiment, the circuit scale can still be reduced as compared to the third embodiment.

Fifth Embodiment

Figure 12:
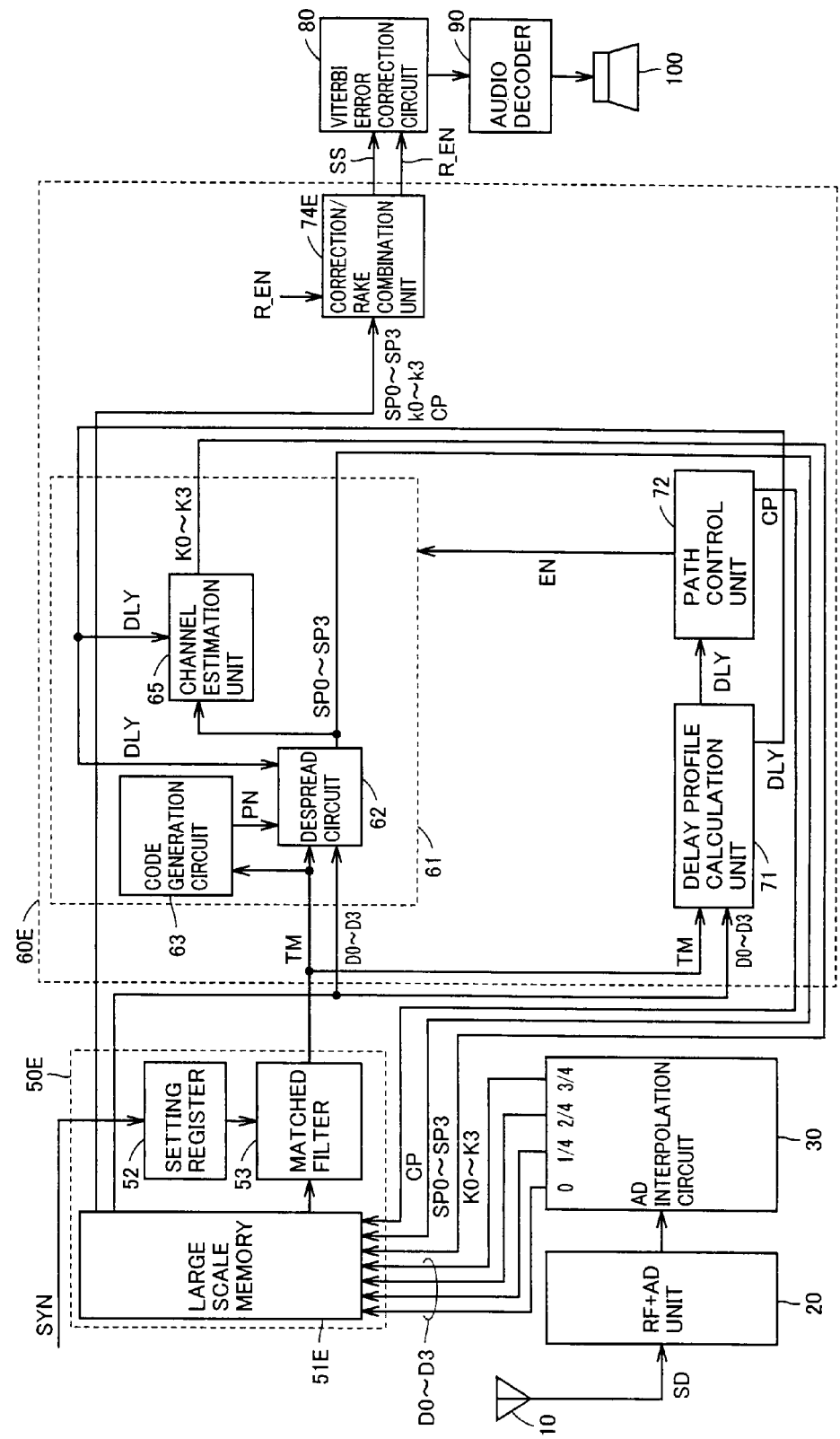
FIG. 12 is a schematic block diagram schematically showing a configuration of a reception apparatus 1E according to a fifth embodiment of the present invention.

FIG. 12 is a schematic block diagram schematically showing a configuration of a reception apparatus 1E according to a fifth embodiment of the present invention.

Referring to FIG. 12, reception apparatus 1E according to the fifth embodiment is different from reception apparatus 1D according to the fourth embodiment in that acquisition unit 50D is replaced by an acquisition unit 50E, and spread spectrum demodulation unit 60D is replaced by a spread spectrum demodulation unit 60E.

Acquisition unit 50E is different from acquisition unit 50D according to the fourth embodiment only in that large scale memory 51D is replaced by a large scale memory 51E. Accordingly, description of the common parts is not repeated herein. Spread spectrum demodulation unit 60E is different from spread spectrum demodulation unit 60D according to the fourth embodiment only in that correction circuit 64 is removed and rake combination unit 74 is replaced by a correction/rake combination unit 74E. Accordingly, description of the common parts is not repeated herein.

In the fifth embodiment, despread circuit 62 of finger operation unit 61 outputs reception symbol signals SP0-SP3 for each path, which are despreaded and thereafter integrated during one symbol, over four chips, to channel estimation unit 65 and large scale memory 51E. Channel estimation unit 65 receives delay signal DLY outputted from delay profile calculation unit 71, calculates correction coefficients K0-K3 in accordance with the amount of phase rotation of reception symbol signals SP0-SP3, and outputs them to large scale memory 51E. Path control unit 72 outputs combination timing signal CP that controls the rake combination timing of correction symbol signals S0-S3 to large scale memory 51E.

Large scale memory 51E once stores reception chip signals D0-D3 and temporarily holds reception symbol signals SP0-SP3 outputted from finger operation unit 61. Reception symbol signals SP0-SP3 held in large scale memory 51E are outputted to correction/rake combination unit 74E together with combination timing signal CP and correction coefficients K0-K3. Correction/rake combination unit 74E receives correction coefficients K0-K3 and corrects the amount of phase rotation of reception symbol signals SP0-SP3 by complex operation.

Correction/rake combination unit 74E further performs the rake combination of the signals having their amount of phase rotation corrected by complex operation (correction symbol signals S0-S3) in accordance with combination timing signal CP that indicates the timing of rake combination and rake combination valid signal R_EN that indicates a valid period of rake combination, and outputs combination symbol signal SS and rake combination valid signal R_EN to viterbi error correction circuit 80.

Thus, by removing correction circuit 64 and replacing rake combination unit 74 by correction/rake combination unit 74E, the circuit scale can still be reduced as compared to the fourth embodiment. Further, by unifying the correction process of phase rotation due to fading and the rake combination process, the amount of operation processes of the entire reception apparatus 1E can be reduced. As a result, power consumption of reception apparatus 1E can be reduced.

Figure 13:
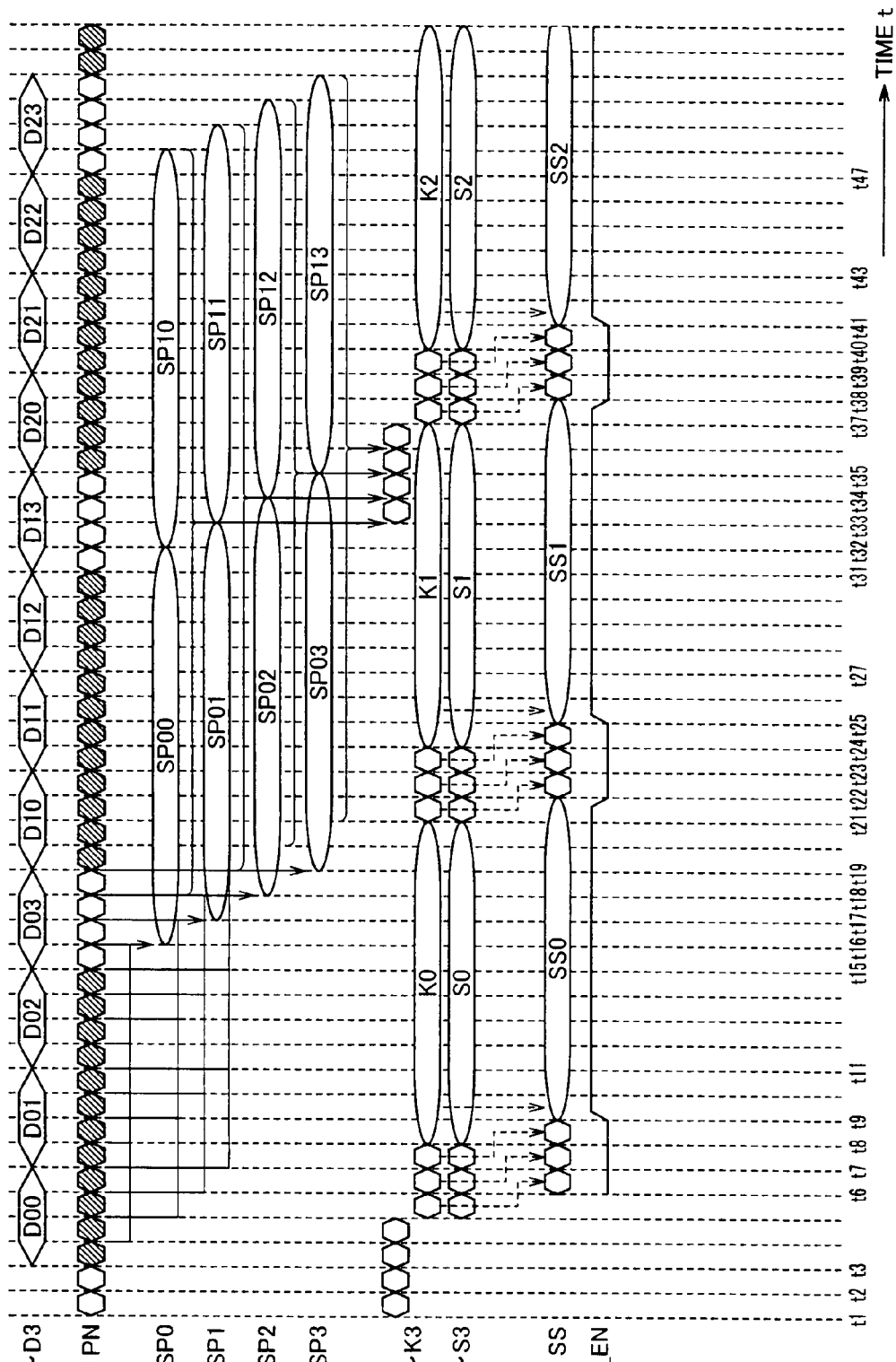
FIG. 13 is an operation waveform diagram for describing a circuit operation of reception apparatus 1E according to the fifth embodiment of the present invention.

FIG. 13 is an operation waveform diagram for describing a circuit operation of reception apparatus 1E according to the fifth embodiment of the present invention.

Referring to FIG. 13, reception chip signals D0-D3 outputted from AD interpolation circuit 30 shown in FIG. 12 are sequentially written to large scale memory 51E shown in FIG. 12 with chip intervals of D00, D01, . . . . Reception chip signals D0-D3 are once stored in matched filter 53 shown in FIG. 12, and thereafter outputted to despread circuit 62 shown in FIG. 12. Reception chip signals D0-D3 outputted to despread circuit 62 are despreaded by despread codes PN each outputted from code generation circuit 63 shown in FIG. 12.

The despreaded reception chip signals (D0-D3)×PN are integrated during one symbol, over four chips, and thereafter outputted from despread circuit 62 as reception symbol signals SP0-SP3 for each path. Reception symbol signals SP0-SP3 are inputted to channel estimation unit 65 and large scale memory 51E shown in FIG. 12. Channel estimation unit 65 rotates reception symbol signals SP0-SP3 by −45° and thereafter integrates them during two symbols, and measures a deviation from 1 axis in IQ coordinates and a distortion amount. Thus calculated correction coefficients K0-K3 are updated by two symbol intervals, and outputted to large scale memory 51E.

Large scale memory 51E temporarily holds reception symbol signals SP0-SP3, combination timing signal CP and correction coefficients K0-K3, and thereafter outputs them to correction/rake combination unit 74E shown in FIG. 12. Correction/rake combination unit 74E receives correction coefficients K0-K3 and corrects the amount of phase rotation of reception symbol signals SP0-SP3 by complex operation.

Correction/rake combination unit 74E further performs the rake combination of the signals having their amount of phase rotation corrected by complex operation (correction symbol signals S0-S3) in accordance with combination timing signal CP that indicates the timing of rake combination and rake combination valid signal R_EN that indicates a valid period of rake combination, and outputs combination symbol signal SS. Combination symbol signal SS is outputted together with rake combination valid signal R_EN, and differentiated from signals in invalid periods (time points t6-t9 and the like) of combination symbol signal SS.

As above, according to the fifth embodiment, by removing correction circuit 64 and replacing rake combination unit 74 by correction/rake combination unit 74E, the circuit scale and power consumption of reception apparatus 1E can still be reduced as compared to the fourth embodiment.

Sixth Embodiment

Figure 14:
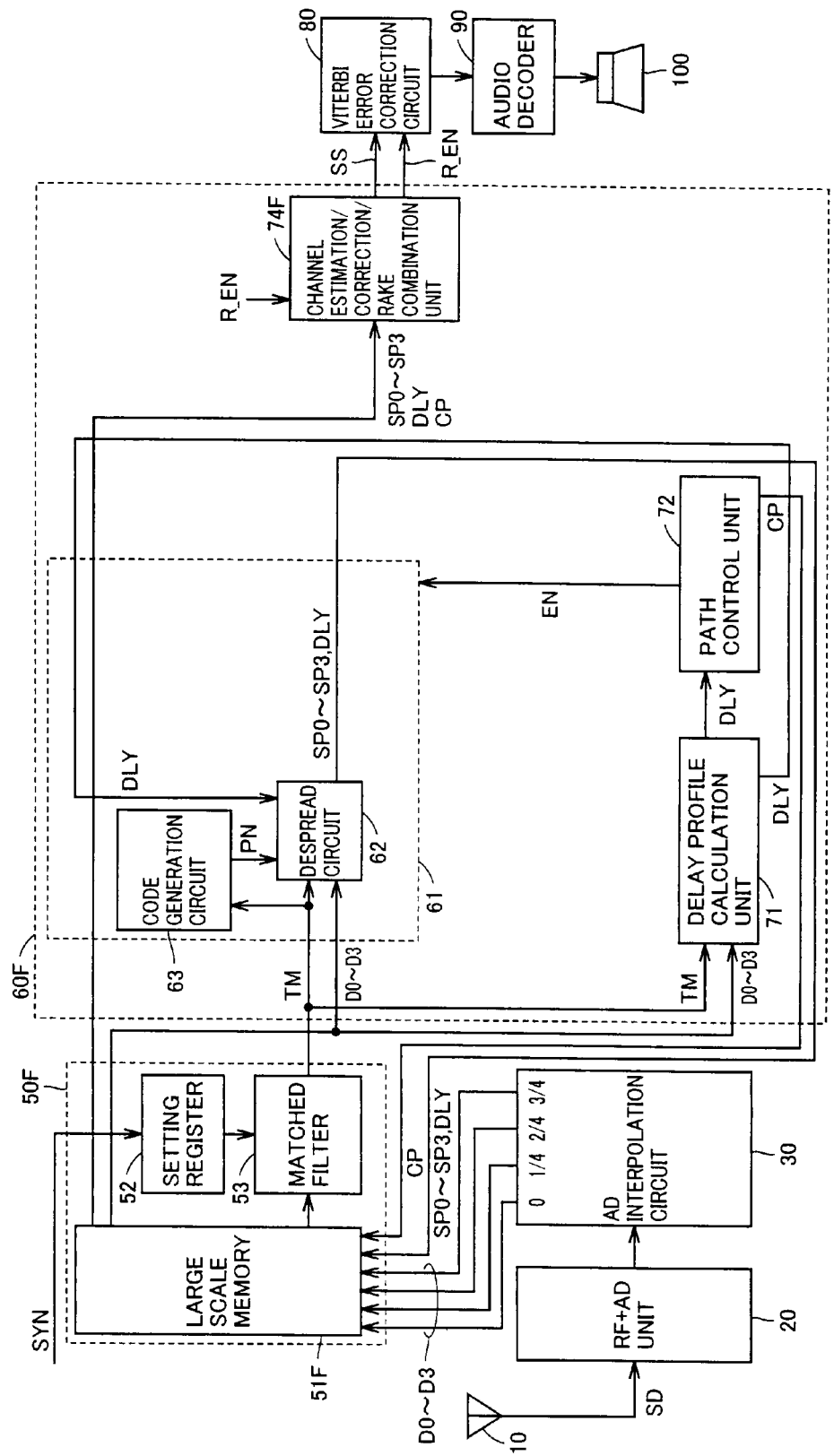
FIG. 14 is a schematic block diagram schematically showing a configuration of a reception apparatus 1F according to a sixth embodiment of the present invention.

FIG. 14 is a schematic block diagram schematically showing a configuration of a reception apparatus 1F according to a sixth embodiment of the present invention.

Referring to FIG. 14, reception apparatus 1F according to the sixth embodiment is different from reception apparatus 1E according to the fifth embodiment in that acquisition unit 50E is replaced by an acquisition unit 50F, and spread spectrum demodulation unit 60E is replaced by a spread spectrum demodulation unit 60F.

Acquisition unit 50F is different from acquisition unit 50E according to the fifth embodiment only in that large scale memory 51E is replaced by a large scale memory 51F. Accordingly, description of the common parts is not repeated herein. Spread spectrum demodulation unit 60F is different from spread spectrum demodulation unit 60E according to the fifth embodiment only in that channel estimation unit 65 is removed and correction/rake combination unit 74E is replaced by a channel estimation/correction/rake combination unit 74F. Accordingly, description of the common parts is not repeated herein.

In the sixth embodiment, despread circuit 62 of finger operation unit 61 outputs reception symbol signals SP0-SP3 for each path, which are despreaded and thereafter integrated during one symbol, over four chips, to large scale memory 51F, together with delay signal DLY calculated in accordance with the reception intensity and the like of reception chip signals D0-D3. Path control unit 72 outputs combination timing signal CP that controls the rake combination timing of correction symbol signals S0-S3 to large scale memory 51F.

Large scale memory 51F once stores reception chip signals D0-D3 and temporarily holds reception symbol signals SP0-SP3 outputted from finger operation unit 61. Reception symbol signals SP0-SP3 held in large scale memory 51F are outputted to channel estimation/correction/rake combination unit 74F together with combination timing signal CP. Channel estimation/correction/rake combination unit 74F receives delay signal DLY and calculates correction coefficients K0-K3 in accordance with the amount of phase rotation of reception symbol signals SP0-SP3.

Channel estimation/correction/rake combination unit 74F further corrects the amount of phase rotation of reception symbol signals SP0-SP3 by complex operation using the calculated correction coefficients K0-K3. Channel estimation/correction/rake combination unit 74F further performs the rake combination of the signals having their amount of phase rotation corrected by complex operation (correction symbol signals S0-S3) in accordance with combination timing signal CP that indicates the timing of rake combination and rake combination valid signal R_EN that indicates a valid period of rake combination, and outputs combination symbol signal SS and rake combination valid signal R_EN to viterbi error correction circuit 80.

Thus, by removing channel estimation unit 65 and replacing correction/rake combination unit 74E by channel estimation/correction/rake combination unit 74F, the circuit scale can still be reduced as compared to the fifth embodiment. Further, by unifying the channel estimation in accordance with the amount of phase rotation due to fading, the correction process of phase rotation and the rake combination process, the amount of operation processes of the entire reception apparatus 1F can be reduced. As a result, power consumption of reception apparatus 1F can be reduced.

Figure 15:
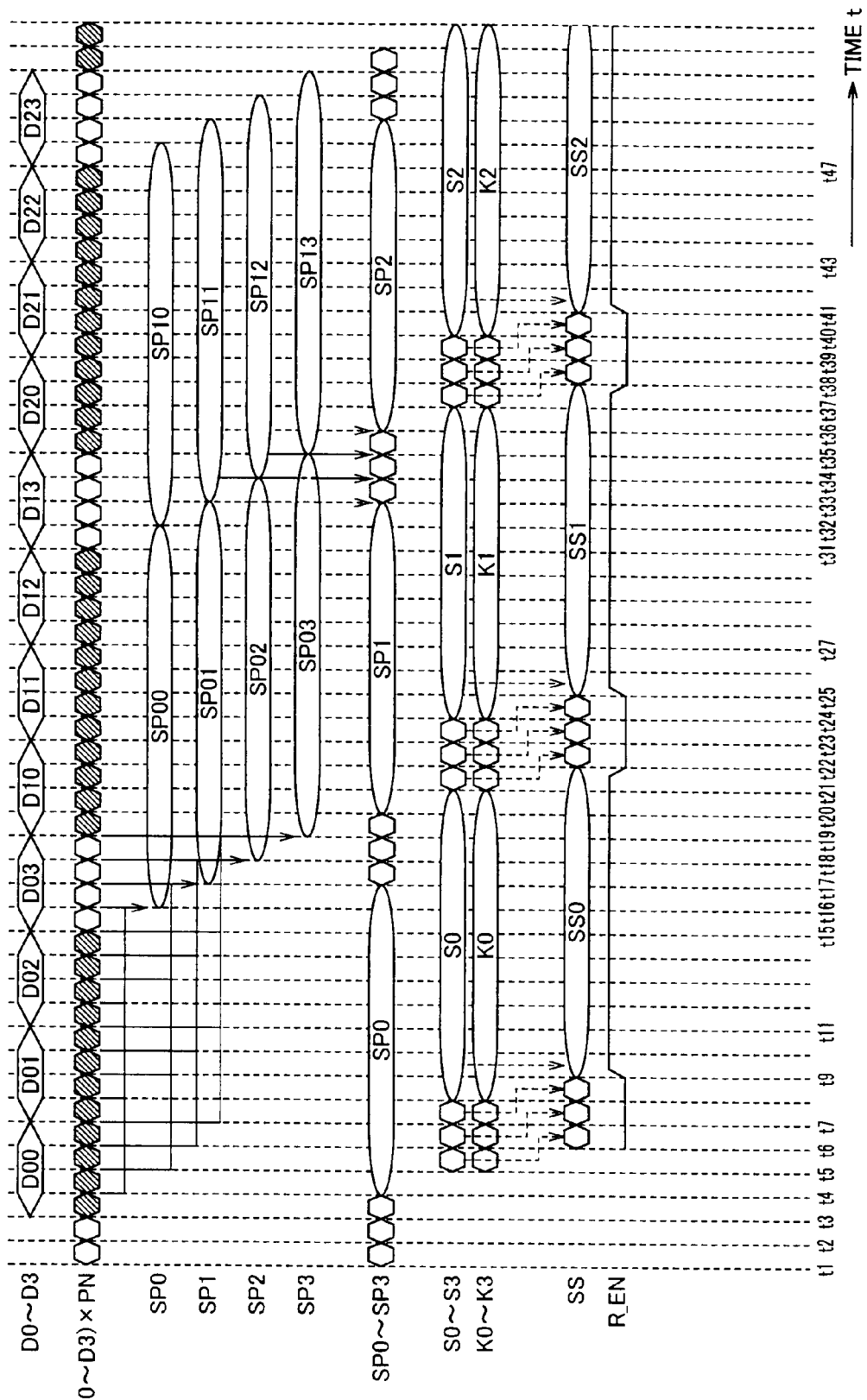
FIG. 15 is an operation waveform diagram for describing a circuit operation of reception apparatus 1F according to the sixth embodiment of the present invention.

FIG. 15 is an operation waveform diagram for describing a circuit operation of reception apparatus 1F according to the sixth embodiment of the present invention.

Referring to FIG. 15, reception chip signals D0-D3 outputted from AD interpolation circuit 30 shown in FIG. 14 are sequentially written to large scale memory 51F shown in FIG. 14 with chip intervals of D00, D01, . . . . Reception chip signals D0-D3 are once stored in matched filter 53 shown in FIG. 14, and thereafter outputted to despread circuit 62 shown in FIG. 14. Reception chip signals D0-D3 outputted to despread circuit 62 are despreaded by despread codes PN each outputted from code generation circuit 63 shown in FIG. 14.

The despreaded reception chip signals (D0-D3)×PN are integrated during one symbol, over four chips, and thereafter outputted from despread circuit 62 as reception symbol signals SP0-SP3 for each path. Reception symbol signals SP0-SP3 are inputted to large scale memory 51F shown in FIG. 14. FIG. 15 also shows correction symbol signals S0-S3 when inputted to large scale memory 51F. Large scale memory 51F temporarily holds reception symbol signals SP0-SP3 and combination timing signal CP, and thereafter outputs them to channel estimation/correction/rake combination unit 74F shown in FIG. 15.

Channel estimation/correction/rake combination unit 74F rotates reception symbol signals SP0-SP3 by −45° and thereafter integrates them during two symbols, and measures a deviation from I axis in IQ coordinates and a distortion amount, and calculates correction coefficients K0-K3. Channel estimation/correction/rake combination unit 74F corrects the amount of phase rotation of reception symbol signals SP0-SP3 by complex operation using the calculated correction coefficients K0-K3.

Channel estimation/correction/rake combination unit 74F further performs the rake combination of the signals having their amount of phase rotation corrected by complex operation (correction symbol signals S0-S3) in accordance with combination timing signal CP that indicates the timing of rake combination and rake combination valid signal R_EN that indicates a valid period of rake combination, and outputs combination symbol signal SS. Combination symbol signal SS is outputted together with rake combination valid signal R_EN, and differentiated from signals in invalid periods (time points t6-t9 and the like) of combination symbol signal SS.

As above, according to the sixth embodiment, by removing channel estimation unit 65 and replacing correction/rake combination unit 74E by channel estimation/correction/rake combination unit 74F, the circuit scale and power consumption of reception apparatus 1F can still be reduced as compared to the fifth embodiment.

Seventh Embodiment

Figure 16:
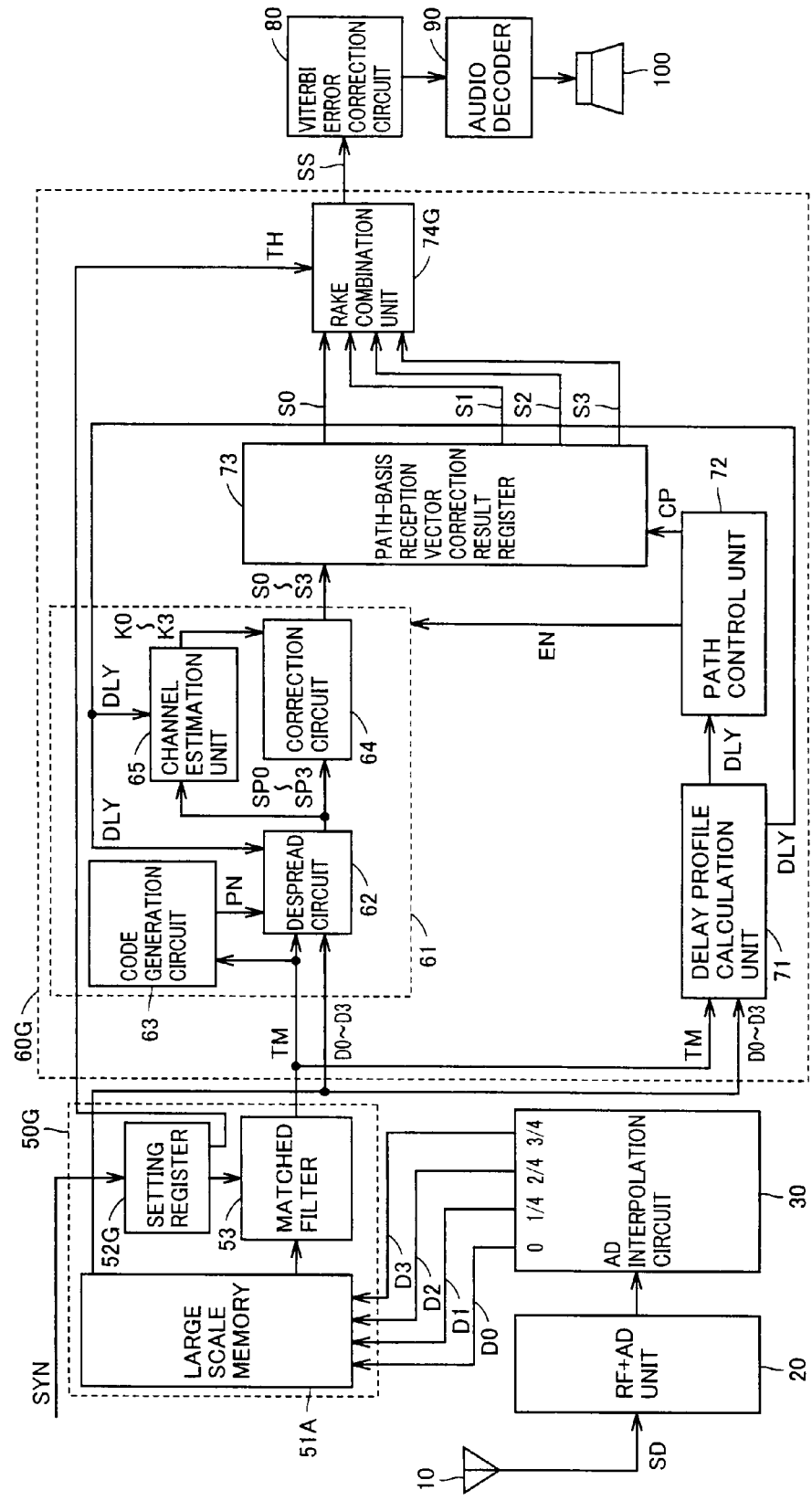
FIG. 16 is a schematic block diagram schematically showing a configuration of a reception apparatus 1G according to a seventh embodiment of the present invention.

FIG. 16 is a schematic block diagram schematically showing a configuration of a reception apparatus 1G according to a seventh embodiment of the present invention.

Referring to FIG. 16, reception apparatus 1G according to the seventh embodiment is different from reception apparatus 1A according to the first embodiment in that acquisition unit 50A is replaced by an acquisition unit 50G, and spread spectrum demodulation unit 60A is replaced by a spread spectrum demodulation unit 60G.

Acquisition unit 50G is different from acquisition unit 50A according to the first embodiment only in that setting register 52 is replaced by a setting register 52G. Accordingly, description of the common parts is not repeated herein. Spread spectrum demodulation unit 60G is different from spread spectrum demodulation unit 60A according to the first embodiment only in that rake combination unit 74 is replaced by a rake combination unit 74G. Accordingly, description of the common parts is not repeated herein.

In the seventh embodiment, setting register 52G of acquisition unit 50G receives acquisition signal SYN and outputs it to matched filter 53, and outputs reference value signal TH that indicates the reference value of the amount of phase error in a threshold value intensity of correction symbol signals S0-S3 to rake combination unit 74G of spread spectrum demodulation unit 60G. Rake combination unit 74G receives reference value signal TH and performs the rake combination of correction symbol signals S0-S3 excluding correction symbol signals having an amount of phase error in a threshold value intensity greater than the reference value, and outputs combination symbol signal SS to viterbi error correction circuit 80.

Thus, by outputting reference value signal TH from setting register 52G to rake combination unit 74G, and not adding the correction symbol signals to the rake combination that have the amount of phase error in the threshold value intensity greater than the reference value based on reference value signal TH, accuracy of rake combination can be improved.

Figure 17:
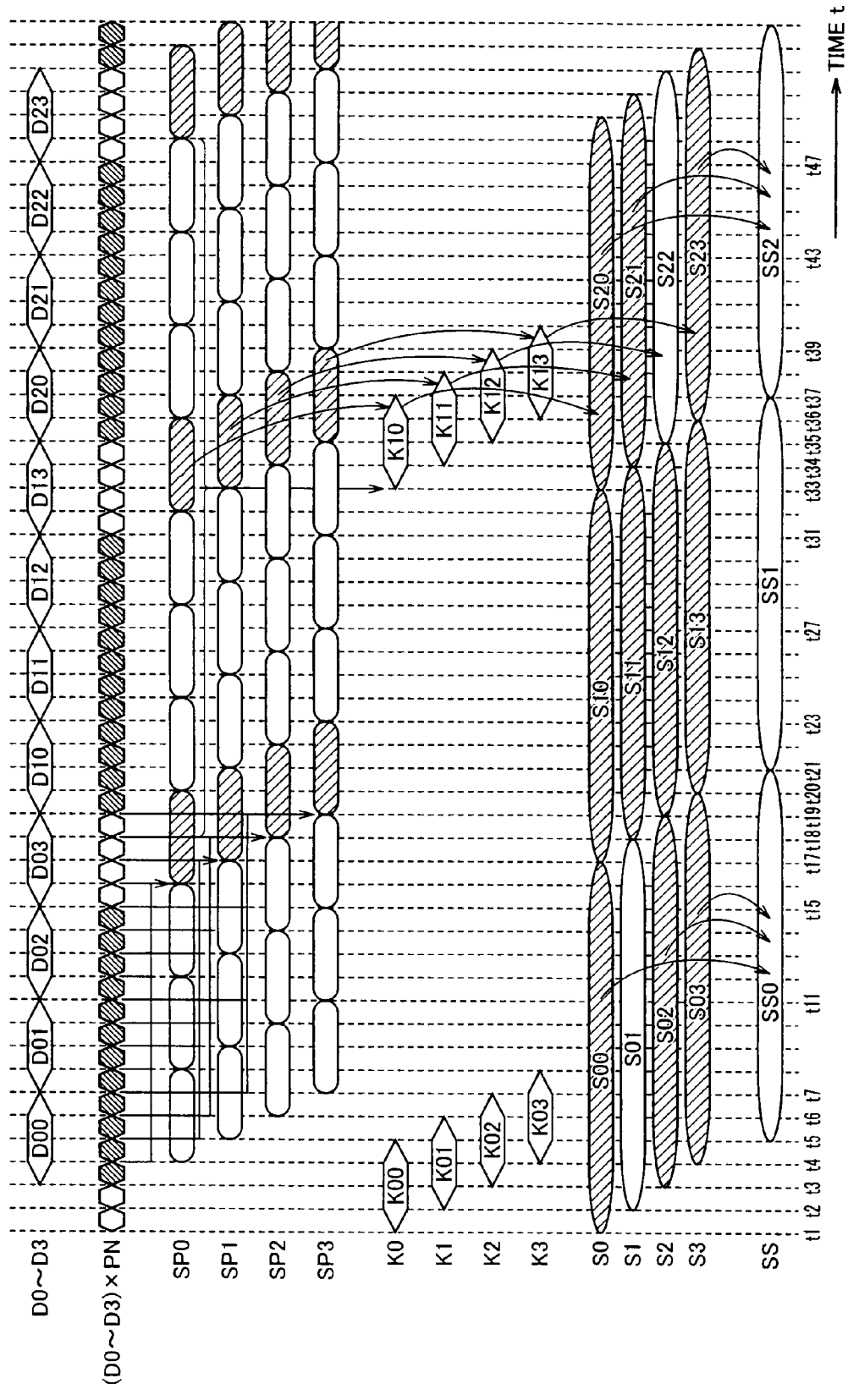
FIG. 17 is an operation waveform diagram for describing a circuit operation of reception apparatus 1G according to the seventh embodiment of the present invention.

FIG. 17 is an operation waveform diagram for describing a circuit operation of reception apparatus 1G according to the seventh embodiment of the present invention.

Referring to FIG. 17, reception chip signals D0-D3 outputted from AD interpolation circuit 30 shown in FIG. 16 are sequentially written to large scale memory 51A shown in FIG. 16 with chip intervals of D0, D1, . . . . Reception chip signals D0-D3 are once stored in matched filter 53 shown in FIG. 16, and thereafter in despread circuit 62 shown in FIG. 16, despreaded by despread codes PN outputted from code generation circuit 63 shown in FIG. 16. The despreaded reception chip signals (D0-D3)×PN are integrated during one symbol, over four chips, and thereafter outputted from despread circuit 62 as reception symbol signals SP0-SP3 for each path.

Reception symbol signals SP0-SP3 are inputted to channel estimation unit 65 and correction circuit 64 shown in FIG. 16. Channel estimation unit 65 rotates reception symbol signals SP0-SP3 by −45° and thereafter integrates them during two symbols, and measures a deviation from I axis in IQ coordinates and a distortion amount. Thus calculated correction coefficients K0-K3 are updated by two symbol intervals, and outputted to correction circuit 64. Correction circuit 64 receives correction coefficients K0-K3, corrects the amount of phase rotation of reception symbol signals SP0-SP3 by complex operation, and outputs correction symbol signals S0-S3.

Correction symbol signals S0-S3 are once stored in path-basis reception vector correction result register 73 shown in FIG. 16, and outputted to rake combination unit 74 shown in FIG. 16. Rake combination unit 74 performs the rake combination of correction symbol signals S0-S3 excluding correction symbol signals S01, S22 having the amount of phase error in a threshold value intensity greater than the reference value, and outputs combination symbol signal SS. Thus, by not adding correction symbol signals S01, S22 to the rake combination that have the amount of phase error in the threshold value intensity greater than the reference value, accuracy of rake combination can be improved.

As above, according to the seventh embodiment, by outputting reference value signal TH from setting register 52G to rake combination unit 74G, and not adding the correction symbol signals to the rake combination that have the amount of phase error in the threshold value intensity greater than the reference value based on reference value signal TH, accuracy of rake combination can be improved.

Eighth Embodiment

Figure 18:
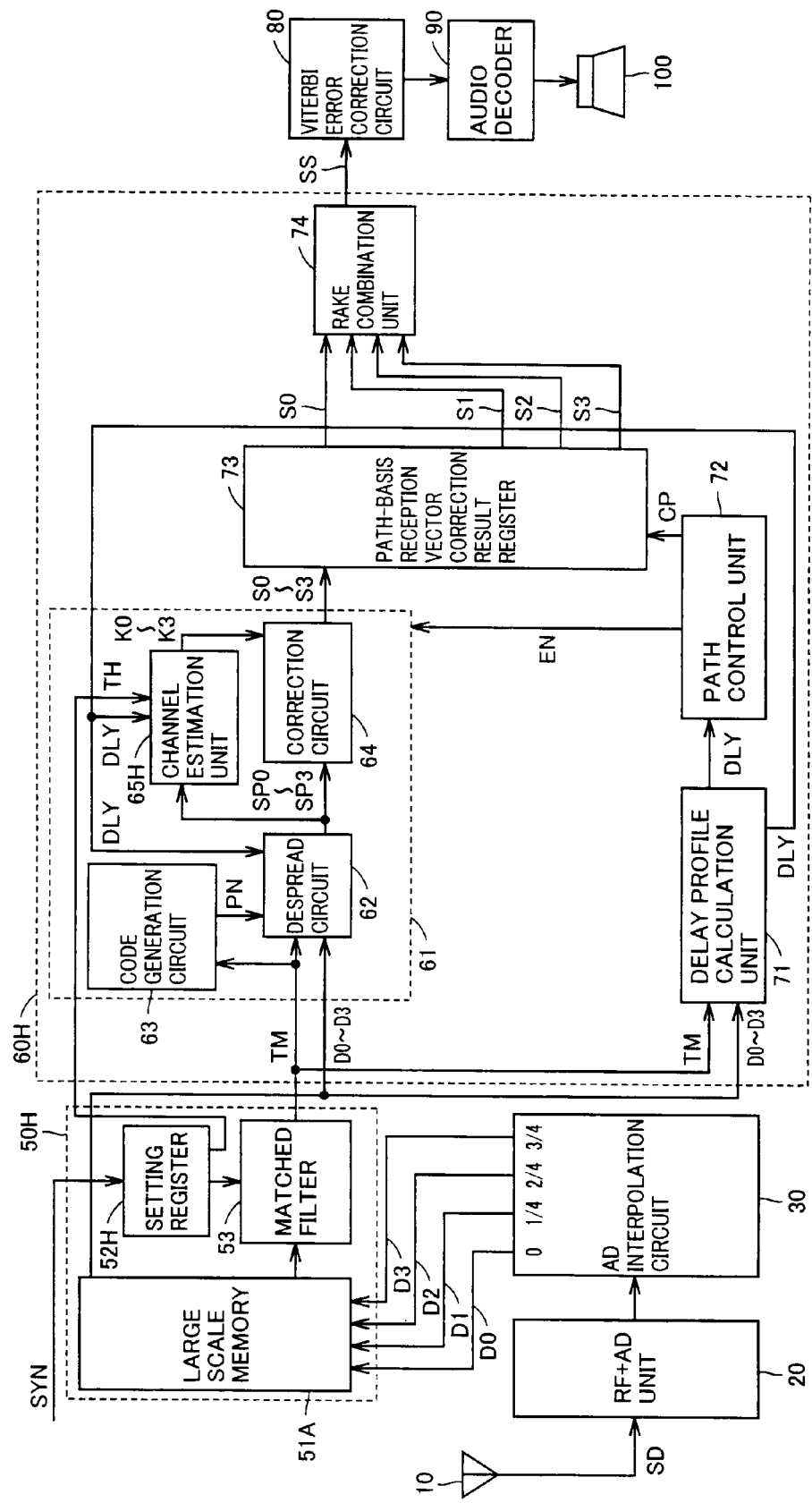
FIG. 18 is a schematic block diagram schematically showing a configuration of a reception apparatus 1H according to an eighth embodiment of the present invention.

FIG. 18 is a schematic block diagram schematically showing a configuration of a reception apparatus 1H according to an eight embodiment of the present invention.

Referring to FIG. 18, reception apparatus 1H according to the seventh embodiment is different from reception apparatus 1A according to the first embodiment in that acquisition unit 50A is replaced by an acquisition unit 50H, and spread spectrum demodulation unit 60A is replaced by a spread spectrum demodulation unit 60H.

Acquisition unit 50H is different from acquisition unit 50A according to the first embodiment only in that setting register 52 is replaced by a setting register 52H. Accordingly, description of the common parts is not repeated herein. Spread spectrum demodulation unit 60H is different from spread spectrum demodulation unit 60A according to the first embodiment only in that channel estimation unit 65 is replaced by a channel estimation unit 65H. Accordingly, description of the common parts is not repeated herein.

In the eighth embodiment, setting register 52H of acquisition unit 50H receives acquisition signal SYN and outputs it to matched filter 53, and outputs reference value signal TH that indicates the reference value of the amount of phase error in a threshold value intensity of reception symbol signals SP0-SP3 to channel estimation unit 65H of spread spectrum demodulation unit 60H.

Channel estimation unit 65H receives reference value signal TH and calculates correction coefficients only for reception symbol signals SP0-SP3 excluding reception symbol signals having an amount of phase error in a threshold value intensity greater than the reference value. Correction circuit 64 corrects the phase rotation due to fading as to reception symbol signals SP0-SP3 of which correction coefficients are calculated, and outputs them to path-basis reception vector correction result register 73.

Thus, by outputting reference value signal TH from setting register 52H to channel estimation unit 65H, and not calculating correction coefficients for those reception symbol signals having the amount of phase error in the threshold value intensity greater than the reference value based on reference value signal TH, accuracy of rake combination can be improved. Further, by removing the reception symbol signals having the amount of phase error greater than the reference value in the threshold value at an earlier stage as compared to the seventh embodiment, the amount of operation processes of the entire reception apparatus 1H can be reduced. As a result, power consumption of reception apparatus 1H can be reduced.

Figure 19:
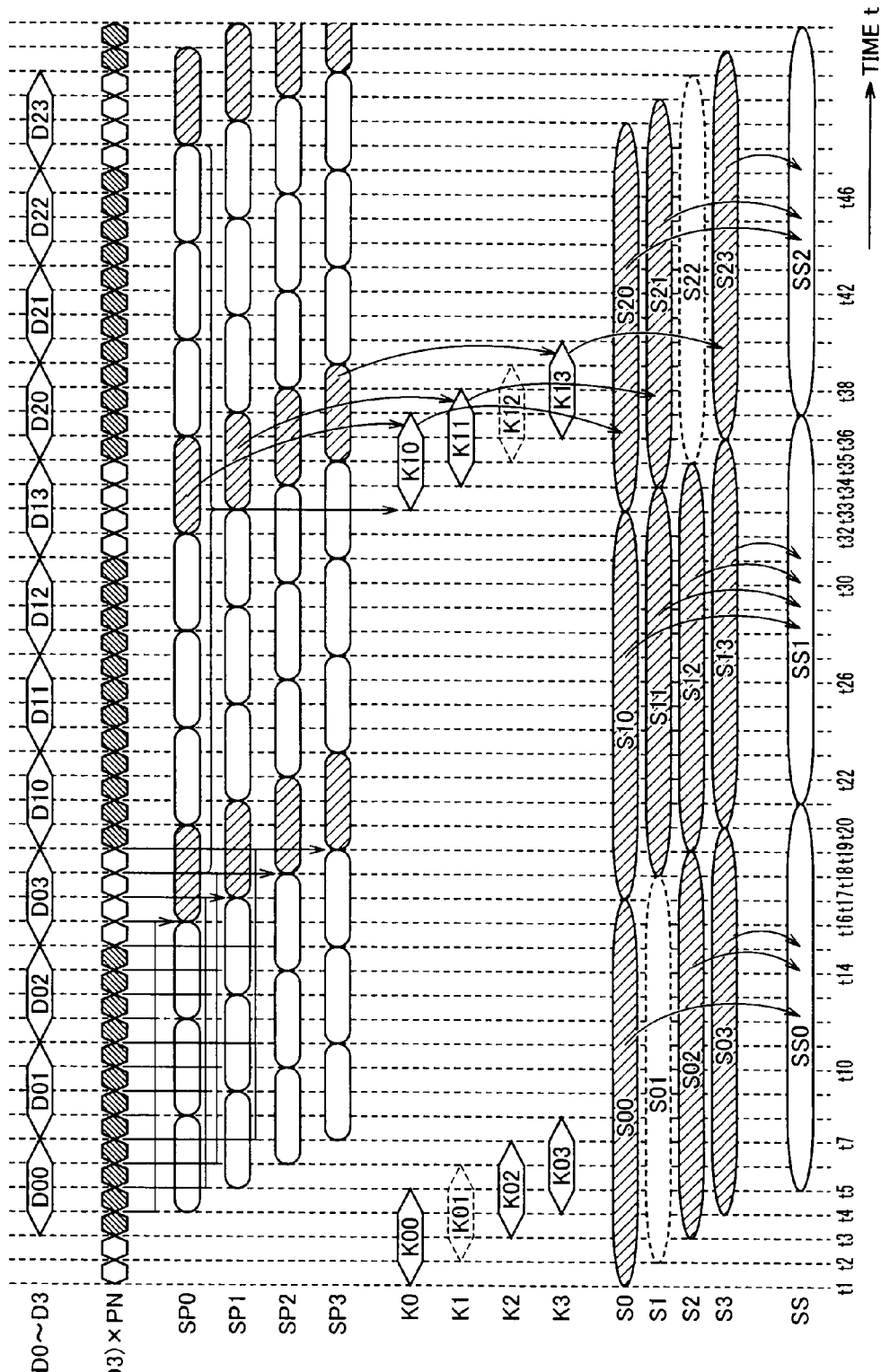
FIG. 19 is an operation waveform diagram for describing a circuit operation of reception apparatus 1H according to the eighth embodiment of the present invention.

FIG. 19 is an operation waveform diagram for describing a circuit operation of reception apparatus 1H according to the eighth embodiment of the present invention.

Referring to FIG. 19, reception chip signals D0-D3 outputted from AD interpolation circuit 30 shown in FIG. 18 are sequentially written to large scale memory 51A shown in FIG. 18 with chip intervals of D0, D1, . . . . Reception chip signals D0-D3 are once stored in matched filter 53 shown in FIG. 18, and thereafter in despread circuit 62 shown in FIG. 18, despreaded by despread codes PN outputted from code generation circuit 63 shown in FIG. 18. The despreaded reception chip signals (D0-D3)×PN are integrated during one symbol, over four chips, and thereafter outputted from despread circuit 62 as reception symbol signals SP0-SP3 for each path.

Reception symbol signals SP0-SP3 are inputted to channel estimation unit 65H and correction circuit 64 shown in FIG. 18. Channel estimation unit 65H calculates correction coefficients K0-K3 only for reception symbol signals SP0-SP3 having an amount of phase error in a threshold value intensity greater than the reference value, excluding correction coefficients K01, K12. Specifically, it rotates reception symbol signals SP0-SP3 by −45° and thereafter integrates them during two symbols, and measures a deviation from I axis in IQ coordinates and a distortion amount.

Thus calculated correction coefficients K0-K3 (excluding K01, K12) are updated by two symbol intervals, and outputted to correction circuit 64. Correction circuit 64 receives correction coefficients K0-K3 (excluding K01, K12), corrects the amount of phase rotation of reception symbol signals SP0-SP3 by complex operation, and outputs correction symbol signals S0-S3. Now, as correction coefficients K01, K12 are excluded, correction symbol signals S01, S22 having the amount of phase error in the threshold value intensity greater than the reference value among correction symbol signals S0-S3 are not outputted.

Correction symbol signals S0-S3 (excluding S01, S22) are once held in path-basis reception vector correction result register 73 shown in FIG. 18, and thereafter subjected to rake combination by rake combination unit 74 shown in FIG. 18 to be combination symbol signal SS. Thus, by not calculating correction coefficients for reception symbol signals SP0-SP3 having the amount of phase error in the threshold value intensity, the accuracy of rake combination can be improved.

As above, according to the eighth embodiment, by outputting reference value signal TH from setting register 52H to channel estimation unit 65H, and not calculating the correction coefficients for reception symbol signals SP0-SP3 having the amount of phase error in the threshold value intensity based on reference value signal TH, accuracy of rake combination can be improved and power consumption of receiving apparatus 1H cam be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reception apparatus, comprising:
an input process unit configured to wirelessly process a reception signal and output a plurality of reception chip signals wherein each of the plurality of reception chip signals correspond to a distinct spread code;
an acquisition unit configured to perform an acquisition of said plurality of reception chip signals and output a timing signal together with said plurality of reception chip signals;
a spread spectrum demodulation unit configured to receive said timing signal, perform a demodulation process of said plurality of reception chip signals outputted from said acquisition unit, and output a combination symbol signal; and
an output process unit configured to perform a decode process of said combination symbol signal and output audio data, wherein
said acquisition unit includes
a memory configured to temporarily hold said plurality of reception chip signals, and
a matched filter configured to perform an acquisition of said plurality of reception chip signals outputted from said memory, and output said timing signal to said spread spectrum demodulation unit, wherein
said memory simultaneously holds said plurality of reception chip signals which are subjected to a same spread code and outputs said plurality of reception chip signals to said matched filter and said spread spectrum demodulation unit, and said spread spectrum demodulation unit successively reads said plurality of reception chip signals subjected to said same spread code in order of arrival at said reception apparatus.

2. The reception apparatus according to claim 1, wherein said spread spectrum demodulation unit includes a finger operation unit performing a finger operation process of said reception chip signal and outputting a correction symbol signal, a path calculation process unit performing a timing process according to a reception intensity of said reception chip signal, a path-basis reception vector correction result register temporarily holding said correction symbol signal, and a rake combination unit performing a rake combination of said correction symbol signal outputted from said path-basis reception vector correction result register and outputting said combination symbol signal, and wherein said finger operation unit has a code generation circuit receiving said reception chip signal and generating a despread code, a despread circuit receiving said despread code, performing despreading of said reception chip signal, and outputting a reception symbol signal for each reception path, a channel estimation unit receiving said reception symbol signal, performing a channel estimation, and outputting a correction coefficient, and a correction circuit receiving said correction coefficient, correcting an amount of phase rotation of said reception symbol signal, and outputting a correction symbol signal.

* * * * *